(12) United States Patent
Scott et al.

(10) Patent No.: US 8,180,971 B2
(45) Date of Patent: May 15, 2012

(54) SYSTEM AND METHOD FOR HARDWARE ACCELERATION OF A SOFTWARE TRANSACTIONAL MEMORY

(75) Inventors: Michael Scott, Rochester, NY (US); Sandhya Dwarkadas, Pittsford, NY (US); Arrvindh Shriraman, Rochester, NY (US); Virendra Marathe, Rochester, NY (US); Michael F. Spear, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 12/912,285

(22) Filed: Oct. 26, 2010

(65) Prior Publication Data

US 2011/0099335 A1    Apr. 28, 2011

Related U.S. Application Data

(63) Continuation of application No. 11/636,717, filed on Dec. 11, 2006, now abandoned.

(60) Provisional application No. 60/748,585, filed on Dec. 9, 2005.

(51) Int. Cl.
*G06F 13/00* (2006.01)
*G06F 13/28* (2006.01)

(52) U.S. Cl. .................. 711/141; 711/124; 711/119

(58) Field of Classification Search .................. None
See application file for complete search history.

(56) References Cited

U.S. PATENT DOCUMENTS

| | | | |
|---|---|---|---|
| 2004/0162948 A1 | 8/2004 | Tremblay et al. | |
| 2004/0162951 A1 | 8/2004 | Jacobson et al. | |
| 2004/0162967 A1 | 8/2004 | Tremblay et al. | |
| 2004/0162968 A1 | 8/2004 | Tremblay et al. | |
| 2004/0163082 A1 | 8/2004 | Tremblay et al. | |
| 2004/0187115 A1 | 9/2004 | Tremblay et al. | |
| 2004/0187116 A1* | 9/2004 | Tremblay et al. | 718/100 |
| 2004/0187123 A1 | 9/2004 | Tremblay et al. | |
| 2007/0043936 A1 | 2/2007 | Day | |
| 2008/0040551 A1 | 2/2008 | Gray | |
| 2008/0270745 A1 | 10/2008 | Saha | |
| 2009/0089520 A1 | 4/2009 | Saha | |

OTHER PUBLICATIONS

R. Rajwar, et al., Transactional Lock-Free Execution of Lock-Based Programs, University of Wisconsin-Madison, 2002, pp. 5-17.

M. Herlihy, et al., "Software Transactional Memory for Dynamic-Sized Data Structures", Sun Microsystems, Inc., PODC Jul. 13-16, 2003; Boston, MA; pp. 92-101.

C. S. Ananian, et al.,, "Unbounded Transactional Memory", MIT Computer Science and Artificial Intelligence Laboratory, Cambridge, MA.

V. J. Marathe, et al., "Adaptive Software Transactional Memory", Dept. of Computer Science, University of Rochester, Rochester, New York.

(Continued)

*Primary Examiner* — Edward Dudek, Jr.
(74) *Attorney, Agent, or Firm* — Murphy & King, P.C.

(57) ABSTRACT

In a transactional memory technique, hardware serves simply to optimize the performance of transactions that are controlled fundamentally by software. The hardware support reduces the overhead of common TM tasks—conflict detection, validation, and data isolation—for common-case bounded transactions. Software control preserves policy flexibility and supports transactions unbounded in space and in time. The hardware includes 1) an alert-on-update mechanism for fast software-controlled conflict detection; and 2) programmable data isolation, allowing potentially conflicting readers and writers to proceed concurrently under software control.

42 Claims, 7 Drawing Sheets

OTHER PUBLICATIONS

M. Martin, et al., "Multifacet's General Execution-driven Multiprocessor Simulator (GEMS) Toolset", ACM SIGARCH Computer Architecture News, vol. 33, No. 4, Sep. 2005.

R. Rajwar, et al., "Virtualizing Transactional Memory", 2005, IEEE.

W. Scherer, III, et al., "Advanced Contention Management for Dynamic Software Transactional Memory", Dept. of Computer Science, University of Rochester, Rochester, New York, PODC, Jul. 17-20, 2005.

P. Damron, et al., "Hybrid Transactional Memory", ASPLOS '06, Oct. 21-25, 2006, San Jose, California.

S. Kumar, et al., "Hybrid Transactional Memory", PPoPP '06, Mar. 29-31, 2006, New York, New York.

V. JU. Marathe, et al., "Lowering the Overhead of Nonblocking Software Transactional Memory", Technical Report 893, Dept. of Computer Science, University of Rochester, Mar. 2006 (corrected May 2006).

K. E. Moore, et al., "LogTm: Log-based Transactional Memory", Dept. of Computer Sciences, University of Wisconsin-Madison, Proceedings of the 12th Annual International Symposium on High Perfornace Computer Arch., 2006, pp. 21-12.

A. Shriraman, et al., "Hardware Acceleration of Software Transactional Memory", Dept. of Computer Science, University of Rochester, Rochester, New York, 2006, pp. 1-10.

M. F. Spear, et al., "Conflict Detection and Validation Strategies for Software Transactional Memory", Dept. of Computer Science, University of Rochester, Rochester, New York.

Final Office Action dated May 12, 2010 received in U.S. Appl. No. 11/636,717.

Non-Final Office Action dated Nov. 30, 2009 received in U.S. Appl. No. 11/636,717.

* cited by examiner

SYSTEM AND METHOD FOR HARDWARE ACCELERATION OF A SOFTWARE TRANSACTIONAL MEMORY

REFERENCE TO RELATED APPLICATION

The present application is a continuation of U.S. patent application Ser. No. 11/636,717, filed Dec. 11, 2006, now pending, which claims the benefit of U.S. Provisional Patent Application No. 60/748,585, filed Dec. 9, 2005, whose disclosures are hereby incorporated by reference in their entireties into the present disclosure.

STATEMENT OF GOVERNMENT INTEREST

The work leading to the present invention was supported in part by NSF grants CCR-0204344, CNS-0411127, CNS-0615139, and CNS-0509270. The government has certain rights in the invention.

FIELD OF THE INVENTION

The present invention relates to transactional memory and more particularly to an integrated hardware-software approach to flexible transactional memory.

DESCRIPTION OF RELATED ART

Explicitly parallel hardware, once confined to high-end servers and scientific computing, will soon dominate the full computing spectrum. As a result of increasing chip density coupled with power limitations, multicore chips—often chip multiprocessors (CMPs) of simultaneous multithreaded cores (SMTs)—are replacing uniprocessors throughout the desktop and laptop markets. The range and scale of such multicore architectures is likely to increase, making support to ease the process of parallelizing applications imperative.

Transactional memory (TM) has emerged as a promising alternative to lock-based synchronization. TM systems seek to increase scalability, reduce programming complexity, and overcome the semantic problems of deadlock, priority inversion, and non-composability associated with locks. TM borrows the notions of atomicity, consistency, and isolation from database transactions. In a nutshell, the programmer or compiler labels sections of code as atomic and relies on the underlying system to ensure that their execution is serializable and as highly concurrent as possible. Several pure hardware and software TMs have been proposed. Pure hardware TM proposals have the advantage of speed, but are typically highly ambitious and embed significant amounts of policy in silicon. Software TM proposals run on stock processors and provide substantial flexibility in policy, but incur significant overhead for data versioning and validation in the face of conflicting transactions.

Damron et al. (P. Damron, A. Fedorova, Y. Lev, V. Luchangco, M. Moir, and D. Nussbaum. Hybrid Transactional Memory. In *Proc. of the 12th Intl. Conf. on Architectural Support for Programming Languages and Operating Systems*, San Jose, Calif., October 2006) describe a design philosophy for a hybrid TM system in which hardware makes a "best effort" attempt to complete transactions, falling back to software when necessary. The goal is to leverage almost any reasonable hardware implementation. Kumar et al. (S. Kumar, M. Chu, C. J. Hughes, P. Kundu, and A. Nguyen. Hybrid Transactional Memory. In *Proc. of the 11$^{th}$ ACM Symp. on Principles and Practice of Parallel Programming*, New York, N.Y., March 2006) describe a specific hardware—software hybrid that builds on the software system of Herlihy et al. (M. Herlihy, V. Luchangco, M. Moir, and W. N. Scherer III. Software Transactional Memory for Dynamic-sized Data Structures. In *Proc. of the 22nd ACM Symp. on Principles of Distributed Computing*, pages 92-101, Boston, Mass., July 2003). Unfortunately, this system still embeds significant policy in silicon. It assumes, for example, that conflicts are detected as early as possible (pessimistic concurrency control), disallowing either read-write or write-write sharing. Scherer et al. (V. J. Marathe, W. N. Scherer III, and M. L. Scott. Adaptive Software Transactional Memory. In *Proc. of the 19$^{th}$ Intl. Symp. on Distributed Computing*, Cracow, Poland, September 2005; W. N. Scherer III and M. L. Scott. Advanced Contention Management for Dynamic Software Transactional Memory. In *Proc. of the 24th ACM Symp. on Principles of Distributed Computing*, Las Vegas, Nev., July 2005) report performance differences across applications of 2×-10× in each direction for this design decision, and for contention management and metadata organization.

SUMMARY OF THE INVENTION

There is thus a need to overcome the above-noted deficiencies of the prior art.

It is therefore an object of the invention to reduce the amount of policy to be embedded in silicon relative to existing hardware TM proposals.

It is another object of the invention to reduce the overhead relative to existing software TM proposals.

To achieve the above and other objects, the present invention is directed to a TM technique in which hardware serves simply to optimize the performance of transactions that are controlled fundamentally by software. At least one embodiment of the invention is directed to a system, RTM, that embodies this philosophy. The hardware support reduces the overhead of common TM tasks—conflict detection, validation, and data isolation—for common-case bounded transactions. Software control (which in at least one embodiment can be based on a modified version of the RSTM software TM (V. J. Marathe, M. F. Spear, C. Heriot, A. Acharya, D. Eisenstat, W. N. Scherer III, and M. L. Scott. Lowering the Overhead of Software Transactional Memory. In *ACM SIGPLAN Workshop on Languages, Compilers, and Hardware Support for Transactional Computing*, Ottawa, ON, Canada, June 2006. Held in conjunction with PLDI 2006. Expanded version available as TR 893, Dept. of Computer Science, Univ. of Rochester, March 2006)) preserves policy flexibility and supports transactions unbounded in space and in time. The hardware includes 1) an alert-on-update mechanism for fast software-controlled conflict detection; and 2) programmable data isolation, allowing potentially conflicting readers and writers to proceed concurrently under software control. Alert-on-update is the simpler and more general of the mechanisms. It can be used for any task that benefits from fine-grain access control. For TM, it eliminates the heavy cost of read-set validation (M. F. Spear, V. J. Marathe, W. N. Scherer III, and M. L. Scott. Conflict Detection and Validation Strategies for Software Transactional Memory. In *Proc. of the 20th Intl. Symp. on Distributed Computing*, Stockholm, Sweden, September 2006). Programmable data isolation additionally eliminates the cost of data copying or logging for bounded transactions.

By leaving policy to software, RTM allows us to experiment with a wide variety of policies, for conflict detection, contention management, deadlock and livelock avoidance, data granularity (e.g., word v. object-based), nesting, and virtualization. Conflict detection is an important aspect of the invention: We permit, but do not require, read-write and write-write sharing, with delayed detection of conflicts. We also employ a software contention manager (W. N. Scherer III and M. L. Scott. Advanced Contention Management for Dynamic Software Transactional Memory. In *Proc. of the 24th ACM Symp. on Principles of Distributed Computing*, Las Vegas, Nev., July 2005) to arbitrate conflicts and determine the order of commits.

Because conflicts are handled in software, speculatively written data can be made visible at commit time with only a few cycles of entirely local execution. Moreover, these data (and a small amount of nonspeculative metadata) are all that must remain in the cache for fast-path execution: data that were speculatively read or nonspeculatively written can safely be evicted at any time. Like the Damron and Kumar hybrid proposals, RTM falls back to a software-only implementation of transactions in the event of overflow, but in contrast not only to the hybrid proposals, but also to TLR (R. Rajwar and J. R. Goodman. Transactional Lock-Free Execution of Lock-Based Programs. In *Proc. of the 10th Intl. Conf. on Architectural Support for Programming Languages and Operating Systems*, pages 5-17, San Jose, Calif., October 2002), LTM (C. S. Ananian, K. Asanovic, B. C. Kuszmaul, C. E. Leiserson, and S. Lie. Unbounded Transactional Memory. In *Proc. of the 11th Intl. Symp. on High Performance Computer Architecture*, pages 316-327, San Francisco, Calif., February 2005), VTM (R. Rajwar, M. Herlihy, and K. Lai. Virtualizing Transactional Memory. In *Proc. of the 32nd Intl. Symp. on Computer Architecture*, Madison, Wis., June 2005), and LogTM (K. E. Moore, J. Bobba, M. J. Moravan, M. D. Hill, and D. A. Wood. LogTM: Log-based Transactional Memory. In *Proc. of the 12th Intl. Symp. on High Performance Computer Architecture*, Austin, Tex., February 2006), it can accommodate "fast path" execution of dramatically larger transactions with a given size of cache. Nonspeculative loads and stores are permitted in the middle of transactions— in fact they constitute the hook that allows us to implement policy in software.

The RTM hardware disclosed herein is intended for implementation either at the L1 level of a CMP with a shared L2 cache, or at the L2 level of an SMP with write-through L1 caches. We describe an implementation based on the classic MESI broadcast protocol. Other implementations (for directory-based protocols, MOESI, etc.) can be implemented within the scope of the invention. Likewise, while our current software inherits a variety of policies (in particular, nonblocking semantics and object-level granularity) from RSTM, our hardware could be used with a variety of other software TMs, including systems that track conflicts at word granularity or use locks to make updates in place.

Because it is based on a software TM system, RTM allows identical code to run efficiently on both legacy and updated hardware. Most hardware TM proposals, by contrast, assume a programming model that is difficult to implement efficiently on legacy machines. In particular, most hardware TM systems roll back everything on abort; most software TM systems distinguish between transactional data, which is rolled back, and nontransactional data, which is not. For the near term, this "mixed" programming model appears to provide an attractive migration path.

In contrast to most previous proposals for transactional hardware, RTM supports both read-write and write-write sharing, allowing transactions to be highly optimistic when it is beneficial to be so. RTM's fast-path (fully hardware-supported) transactions require cache space only for speculative writes; lines that have only been read can safely be evicted. Transactions that nonetheless overflow hardware resources fall back gracefully to software, and interoperate smoothly with fast-path transactions. All transactions employ a software contention manager, enabling the use of adaptive or application-specific policies.

We have evaluated RTM using a detailed implementation in the GEMS/Simics simulation infrastructure (M. M. K. Martin, D. J. Sorin, B. M. Beckmann, M. R. Marty, M. Xu, A. R. Alameldeen, K. E. Moore, M. D. Hill, and D. A. Wood. Multifacet's General Execution-driven Multiprocessor Simulator (GEMS) Toolset. *Computer Architecture News*, September 2005). For a suite of microbenchmarks with varying access patterns, we find that RTM improves the performance of common-case bounded transactions by as much as a factor of two. Moreover, RTM shows good scalability as the number of threads increases. The proposed hardware mechanisms eliminate data copying and dramatically reduce the overhead of bookkeeping and validation.

RTM-Lite, a simpler embodiment that relies on alert-on-update but not programmable data isolation, is effective at eliminating validation overhead, but loses to RTM for transactions that modify large objects. When transactions overflow the available hardware support, performance degrades linearly from that of the all fast-path mode to that of the all overflow mode, based on the fraction of overflowed transactions. Detecting conflicts eagerly (on first access) or lazily (at commit time), enabled by the multiple-writer protocol, can result in differences in performance in either direction depending on the application access pattern (up to two orders of magnitude for one workload), demonstrating the need for policy flexibility.

Aspects of the invention are described in the following paper, which is hereby incorporated by reference in its entirety into the present disclosure: A. Shriramam et al, "Hardware Acceleration of Software Transactional Memory," *First ACM SIGPLAN Workshop on Languages, Compilers, and Hardware Support for Transactional Computing (TRANSACT)*, Ottawa, Ontario, June 2006.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
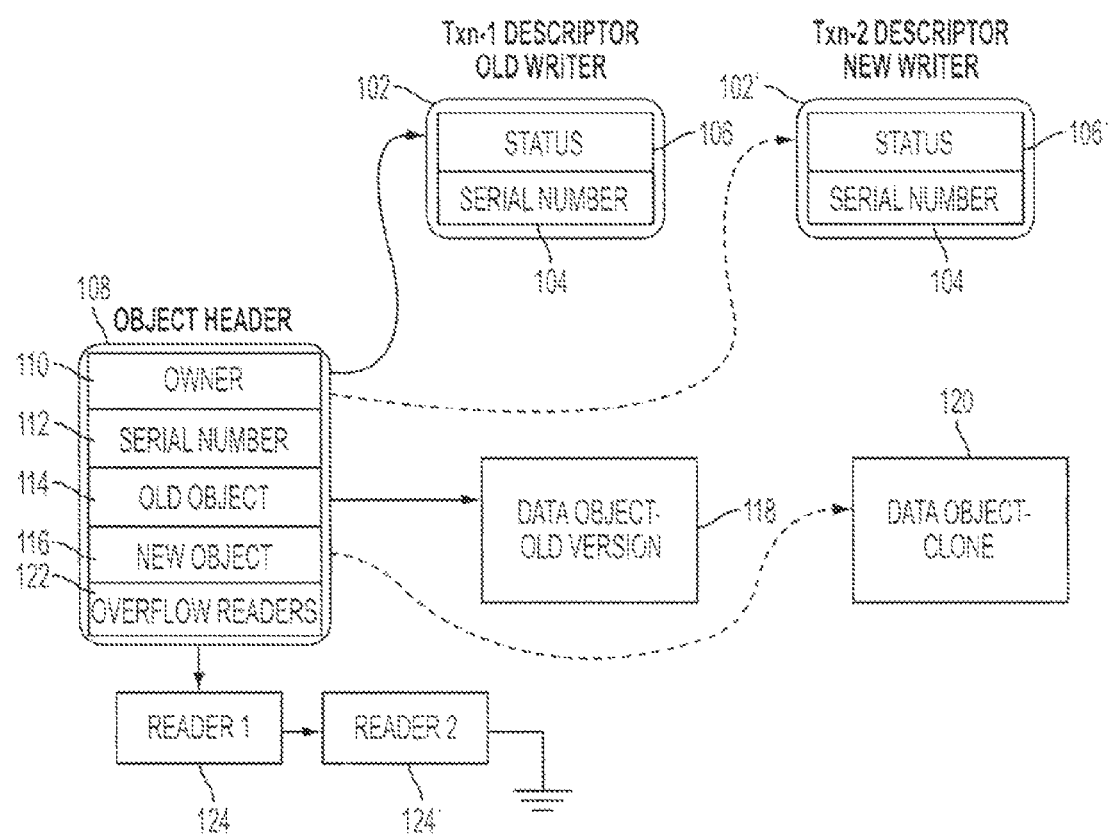
FIG. 1 shows an RTM metadata structure.
Figure 2A:
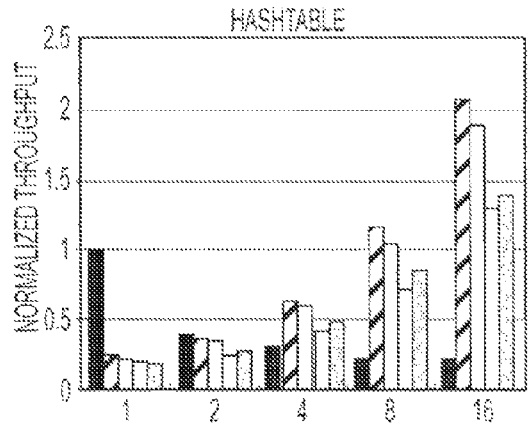
FIGS. 2A-2F show throughput (transactions per second) normalized to single-thread coarse grain locks, except that RandomGraph in FIG. 2F is normalized to single-thread RSTM.
Figure 2B:
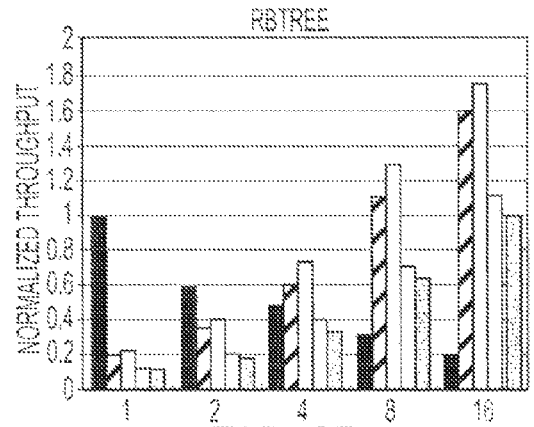
Figure 2C:
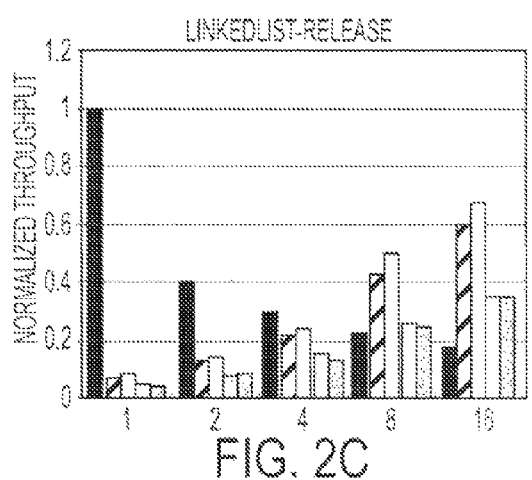
Figure 2D:
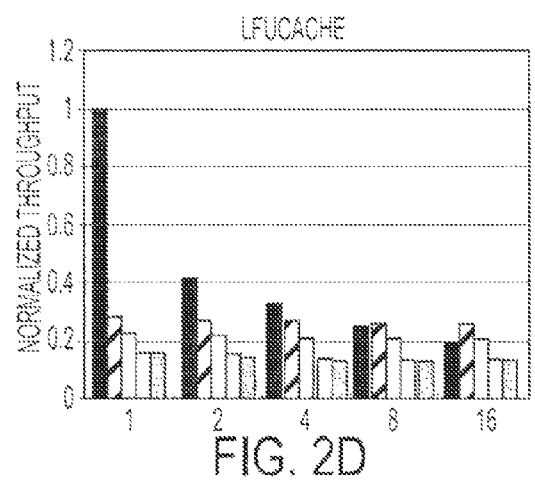
Figure 2E:
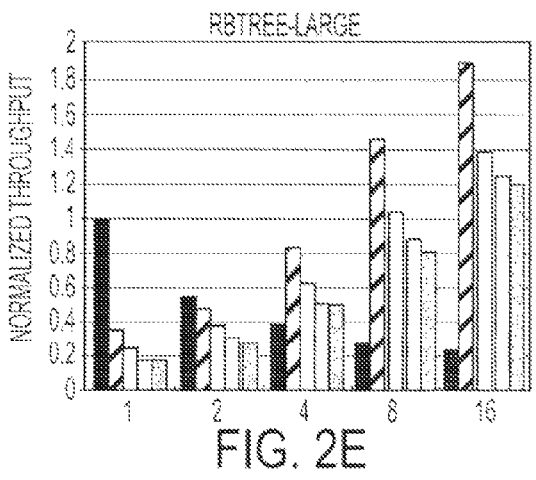
Figure 2F:
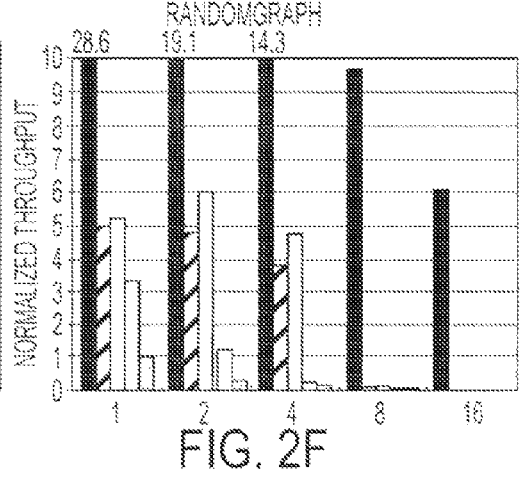

A preferred embodiment of the present invention will be set forth in detail with reference to the drawings, in which like reference numerals refer to like elements or steps throughout.

We will first describe our hardware mechanisms in detail, including instruction set extensions, coherence protocol, and the mechanism used to detect conflicts and abort remote transactions. We will then describe the RTM runtime that leverages this hardware support. We will then evaluate the performance of RTM in comparison to coarse-grain locks, an all-software TM system, and an "RTM-Lite" system that uses alert-on-update but not programmable data isolation. We will also present results to demonstrate the benefits of policy flexibility.

In terms of hardware support, transactional memory has two principal requirements: the ability to detect when transactions in different threads conflict, and the ability to hide a transaction's updates from other threads until the transaction commits. These requirements can be met in hardware or in software. We describe hardware mechanisms—alert-on-update and programmable data isolation—that can accelerate software implementations without constraining policy.

A first aspect of the preferred embodiment is called alert-on-update (AOU). To enable conflict detection, we implement a simple technique to selectively expose coherence events (potential writes by other processors) to user programs: threads register an alert handler and then selectively mark lines of interest as alert-on-update. When a cache controller detects a remote write or eviction of a line that is marked in the local cache, it notifies the local processor, effecting a spontaneous subroutine call to the current thread's alert handler. Because the state of a line may change due to conflict or capacity misses on other lines, a handler must in general double-check the cause of the alert.

Implementation of alert-on-update relies on the cache coherence protocol, but is essentially independent of protocol details. Coherence requires, by definition, that a controller be notified when the data cached in a local line is written elsewhere in the machine. The controller also knows of conflict and capacity evictions. We simply alert the processor of these events when they occur on lines that have previously been marked. The alert includes the address of the affected line and the nature of the event.

Table 1 below summarizes hardware requirements. These include special registers to hold the address of the user-mode handler and a description of the current alert; an extra entry in the interrupt vector table (for alerts that happen while running in kernel mode); and instructions to set and unset the user-mode handler and to mark and unmark cache lines (i.e., to set and clear their alert bits). The marking instruction, aload, also returns a word of the line.

TABLE 1

Alert-on-update hardware requirements

| Registers | |
|---|---|
| %aou_handlerPC: | address of the handler to be called on a user-space alert |
| %aou_oldPC: | program counter immediately prior to the call to %aou_handlerPC |
| %aou_alertAddress: | address of the line whose status change caused the alert |
| %aou_alertType: | remote write, lost alert, or capacity/conflict eviction |
| interrupt vector table | one extra entry to hold the address of the handler for kernel-mode alerts |
| Instructions | |
| set_handler %r | move %r into %aou_handlerPC |
| clear_handler | clear %aou_handlerPC and flash-clear the alert bits for all cache lines |

TABLE 1-continued

Alert-on-update hardware requirements

| aload [%r1], %r2 | load the word at address %r1 into register %r2, and set the alert bit(s) for the corresponding cache line |
|---|---|
| arelease %r | unset the alert bit for the cache line that corresponds to the address in register %r |
| arelease_all | flash-clear alert bits on all cache lines |
| Cache | one extra bit per line, orthogonal to the usual state bits |

ALoads serve two related roles in RTM, which we describe in more detail below. First, every transaction ALoads a word that describes its current status. If any other transaction aborts it (by modifying this word), the first transaction is guaranteed to notice. Second, a transaction can ALoad a word of metadata associated with a given object. If writers modify that word before committing changes to the object, readers are guaranteed to notice. (Significantly, this mechanism does not require that conflict be detected as soon as some word of the object is speculatively written, thereby permitting lazy conflict detection.)

A second aspect of the preferred embodiment is called programmable data isolation (PDI). Caches inherently provide data buffering, but coherence protocols normally propagate modifications quickly to all copies. As in most hardware transactional memory proposals, we allow a thread to delay this propagation while executing speculatively, and then to make an entire set of changes visible to other threads atomically. We use a level of cache close to the processor to hold the new copy of data, and rely on shared lower levels of the memory hierarchy to hold the old values of lines. Unlike most other hardware TM designers, however, we allow lines to be read and written transactionally even when they are also being written by some other, concurrent transaction.

We describe an implementation based on the traditional MESI coherence protocol, which we label TMESI. A protocol transition diagram appears in FIG. 6. Table 2 below summarizes hardware requirements.

TABLE 2

TMESI hardware requirements

| Registers | |
|---|---|
| %t_in_flight: | a bit to indicate that a transaction is currently executing |
| Instructions | |
| begin_t | set the %t_in_flight register to indicate the start of a transaction |
| tstore [%r1], %r2 | write the value in register %r2 to the word at address %r1; isolate the line (TMI state) |
| tload [%r1], %r2 | read the word at address %r1, place the value in register %r2, and tag the line as transactional |
| abort | discard all isolated (TMI or TI) lines; clear all transactional tags and reset the %t_in_flight register |
| cas-commit [%r1], %r2, %r3 | compare %r2 to the word at address %r1; if they match, commit all isolated writes (TMI lines) and store %r3 to the word; otherwise discard all isolated writes; in either case, clear all transactional tags, discard all isolated reads (TI lines), and reset the %t_in_flight register |
| Cache | two extra stable states, TMI and TI, for isolated reads and writes; transactional tag for the MES states |

Potentially speculative reads and writes use TLoad and TStore instructions. These instructions are interpreted as speculative when the transactional bit (% t_in_flight) is set. As described below, this allows the same code path to be used by both fast-path transactions and those that overflow the available hardware support. TStore is used for writes that require isolation. TLoad is used for reads that can safely be cached despite remote TStores.

Speculative reads and writes employ two new coherence states: TI and TMI. These states allow a software policy, if it chooses, to perform lazy detection of read-write and write-write conflicts. Hardware helps in the detection task by piggybacking a threatened (T) signal/message, analogous to the traditional shared (S) signal/message, on responses to read-shared bus requests whenever the line exists in TMI state somewhere in the system. The T signal warns a reader of the existence of a potentially conflicting writer.

TMI serves to buffer speculative local writes. Regardless of previous state, a line moves to TMI in response to a PrTWr (the result of a TStore). A TMI line then reverts to M on commit and to I on abort. Software must ensure that among any concurrent conflicting writers, at most one commits, and if a conflicting reader and writer both commit, the reader does so first from the point of view of program semantics. The first TStore to a modified cache line results in a write back prior to transitioning to TMI to ensure that lower levels of the memory hierarchy have the latest non-speculative value. A line in TMI state threatens read requests and suppresses its data response, allowing lower levels of the memory hierarchy to supply the non-speculative version of the data.

TI allows continued use of data that have been read by the current transaction, but that may have been speculatively written by a concurrent transaction in another thread. An I line moves to TI when threatened during a TLoad; an M, E, or S line moves to TI when written by another processor while tagged transactional (indicating that a TLoad has been performed by the current transaction). A TI line must revert to I when the current transaction commits or aborts, because a remote processor has made speculative changes which, if committed, would render the local copy stale. No writeback or flush is required since the line is not dirty. Even during a transaction, silent eviction and re-read is not a problem because software ensures that no writer can commit unless it first aborts the reader.

The CAS-Commit instruction performs the usual function of compare-and-swap. In addition, if the CAS succeeds, speculatively written (TMI) lines revert to M, thereby making the data visible to other readers through normal coherence actions. If the CAS fails, TMI lines are invalidated, and software branches to an abort handler. In either case, speculatively read (TI) lines revert to I and any transactional tags are flashed clear on M, E, and S lines. The motivation behind CAS-Commit is simple: software TM systems invariably use a CAS or its equivalent to commit the current transaction; we overload this instruction to make buffered transactional state once again visible to the coherence protocol. The Abort instruction clears the transactional state in the cache in the same manner as a failed CAS-Commit.

To the best of our knowledge, RTM and TCC (L. Hammond, V. Wong, M. Chen, B. Hertzberg, B. Carlstrom, M. Prabhu, H. Wijaya, C. Kozyrakis, and K. Olukotun. Transactional Memory Coherence and Consistency. In *Proc. of the 31st Intl. Symp. on Computer Architecture*, München, Germany, June 2004) are the only hardware or hybrid TM systems that support read-write and write-write sharing; other schemes all perform eager conflict detection at the point where a conventional coherence protocol must invalidate a speculatively read line or demote a speculatively written line. By allowing a reader transaction to commit before a conflicting writer, RTM permits significant concurrency in the face of long-running writers. Write-write sharing is more problematic, since it cannot result in more than one commit. Even so, it allows us to avoid aborting a transaction in favor of a competitor that is ultimately unable to commit; it may also be desirable in conjunction with early release (an unsafe, application-specific optimization alluded to below). Note that nothing about the TMESI protocol requires read-write or write-write sharing; if the software protocol detects and resolves conflicts eagerly, the TI state will simply go unused.

To simplify the management of metadata, our implementation of RTM employs a Wide-CAS instruction (not shown in Table 2) that implements compare-and-swap across multiple contiguous locations (within a single cache line). As in Itanium's cmp8xchg16 instruction, if the first two words at location A match their "old" values, all words are swapped with the "new" values (loaded into contiguous registers). Success is detected by comparing old and new values in the registers.

Cache tag encoding is handled in the following manner. All told, a TMESI cache line can be in any one of the four MESI states (I, S, E, M), the two speculative states (TI, TMI), or transactionally tagged variants of M, E, and S. If the protocol were implemented as a pure automaton, this would imply a total of 9 stable states, compared to 4 in the base protocol. Regular MESI also has three transient states, which the automaton enters while waiting for a response to a remote message. TMESI adds four additional such states, for a total of 16 rather than 7. Any of these states could also be tagged as alert-on-update.

It would be possible to eliminate the transactionally tagged MES states entirely, at the cost of some extra reloads in the event of read-write sharing. Suppose thread T1 has read line X transactionally at some point in the past. The transactional tag indicates that X was TLoaded as part of the current transaction. A remote write to X (appearing as a BusRdX protocol message) can move X to TI, because software will be tracking potential conflicts, and will allow T1 to commit only if it does so before any conflicting transaction commits. If TLoads are replaced with normal loads and/or the transactional tags eliminated, T1 will need to drop X to I, but a subsequent load will bring it back to TI.

To allow fast commits and aborts, our cache tags can be encoded in six bits, as shown in Table 3 below. In Table 3, the A (alert) bit is orthogonal to the other states. At commit time, based on the outcome of the CAS in CAS-Commit, we broadcast a 1 (or 0) on the C/A bit line and use the T bits to conditionally enable only the tags of transactional lines. Following this, we flash-clear the A and T bits. For TM, TE, TS, and TI the flash clear alone would suffice, but TMI lines must revert to M on commit and I on abort. We use the C/A bit to distinguish between these: when the line is next accessed, M/I and C/A are used to interpret the state before being reset. If T is 0, the MESI bits are 11, C/A is 0, and M/I is 1, the cache line state is invalid and the MESI bits are changed to reflect this. In all other cases, the state reflected by the MESI bits is correct.

TABLE 3

Tag array encoding for fast commits and aborts

| T | A | MESI | C/A | M/I | State |
|---|---|------|-----|-----|-------|
| 0 | — | 0 0  | —   | —   | I     |
| 0 | — | 1 1  | 0   | 1   | I     |
| 0 | — | 0 1  | —   | —   | S     |
| 0 | — | 1 0  | —   | —   | E     |
| 0 | — | 1 1  | 1   | —   | M     |

TABLE 3-continued

Tag array encoding for fast commits and aborts

| T | A | MESI | C/A | M/I | State |
|---|---|------|-----|-----|-------|
| 0 | — | 1 1  | 0   | 0   |       |
| 1 | — | 0 0  | —   | —   | TI    |
| 1 | — | 0 1  | —   | —   | TS    |
| 1 | — | 1 0  | —   | —   | TE    |
| 1 | — | 1 1  | —   | 0   | TM    |
| 1 | — | 1 1  | —   | 1   | TMI   |

T Line is (1)/is not (0) transactional
A Line is (1)/is not (0) alert-on-update
MESI 2 bits; I (00), S (01), E (10), or M (11)
C/A Most recent txn committed (1) or aborted (0)
M/I Line is/was in TMI (1)

The RTM runtime is based on the open-source RSTM system, a C++ library that runs on legacy hardware. RTM uses alert-on-update and programmable data isolation to avoid copying and to reduce bookkeeping and validation overheads, thereby improving the speed of "fast path" transactions. When a transaction's execution time exceeds a single quantum, or when the working set of a transaction exceeds the ALoad or TStore capacity of the cache, RTM restarts the transaction in a more conservative "overflow mode" that supports unboundedness in both space and time.

RTM is 100% source-code compatible with RSTM. Details of the API can be found in the above-cited Marathe et al. Ottawa paper, whose disclosure is hereby incorporated by reference in its entirety into the present disclosure. Briefly, transactions are lexically scoped, and delimited by BEGIN_TRANSACTION and END_TRANSACTION macros. BEGIN_TRANSACTION sets the alert handler for a transaction and configures per-transaction metadata. END_TRANSACTION issues a CAS-Commit.

Objects accessed transactionally must derive from a provided generic transaction class. Among other things, the transactional object provides access to transaction-safe memory management routines. (We can use any thread-safe memory allocator, and indeed we have experimented with many. The transactional object wraps any given allocator in code that defers the reuse of deleted space until we are certain that no doomed transaction retains a stale pointer to the object.)

In order to access fields of the object, the programmer must request read or write permission by performing an open_RO or open_RW call, which returns a pointer to the object. These calls are explicit in the source code, though with compiler support they could easily be generated automatically. They fail if performed outside a transaction. The interface also provides a release method (described in the above-cited Herlihy et al. Boston paper), which allows a programmer with application-specific semantic knowledge to inform the runtime that conflicts on the object are no longer cause to abort the transaction. Release is a potentially unsafe optimization, which must be used with care.

One additional operation, used primarily inside the runtime system, is also available to programmers. The runtime often requires that a set of related metadata updates be allowed to complete, i.e., that the transaction not be aborted immediately. This is accomplished by using a flag to indicate that the set of updates are in progress. If an alert occurs while the flag is set, the handler defers its normal actions, sets another flag, and returns. When the runtime finishes its updates, it clears the first flag, checks the second, and jumps back to the handler if action was deferred. Applications can use this "deferred abort" mechanism to protect a set of related updates to nontransactional data from within a transaction (e.g., for logging purposes). In effect, deferred abort blocks serve as a cheap, non-isolated approximation of open nested transactions.

As shown in FIG. 1, every RTM transaction is represented by a descriptor 102, 102' containing a serial number 104, 104' and a word 106, 106' that indicates whether the transaction is currently ACTIVE, COMMITTED, or ABORTED. The serial number is incremented every time a new transaction begins. It enables the reuse of descriptors without the need for cleanup in the wake of a successful commit. If the serial numbers of an object header 108 and descriptor 102 or 102' do not match, then the descriptor's status is assumed to be COMMITTED. ABORTED overflow transactions must clean up all references to their descriptors before they start a new transaction.

Every transactional object is represented by a header 108 containing five main fields: a pointer 110 to an "owner" transaction, the owner's serial number 112, pointers 114, 116 to valid (old) and speculative (new) versions of the object 118, 120, and a head pointer 122 to a list of overflow transactions 124, 124', . . . , currently reading the object. The open_RO method returns a pointer to the most recently committed version of the object. Typically the owner/serial number pair indicates a COMMITTED transaction, in which case the New pointer is valid if it is not NULL, and otherwise the Old pointer is valid. If the owner/serial number pair indicates an ABORTED transaction, then the old pointer is always valid. When the owner is ACTIVE, there is a conflict.

As shown in FIG. 1, a writer transaction is in the process of acquiring the object, overwriting the Owner pointer and Serial Number fields, and updating the Old Object pointer to refer to the previously valid copy of the data. A fast-path transaction will set the New Object field to null; an overflow transaction will set it to refer to a newly created clone. Several overflow transactions can work concurrently on their own object clones prior to acquire time, just as fast-path transactions can work concurrently on copies buffered in their caches.

An object never has entries in the overflow readers list while there is an ACTIVE owner. The open_RW method returns a pointer to a writable copy of the object. For fast-path transactions this is the valid version that would be returned by open_RO; updates will be buffered in the cache. For overflow transactions it is a clone or copy of the valid version.

At some point between its open_RW and commit time, a transaction must acquire every object it has written. The acquire operation first gets permission from a software contention manager to abort all transactions in the overflow reader list. It then writes the owner's ID, the owner's serial number, and the addresses of both the last valid version and the new speculative version into the header using (in our current implementation) a Wide-CAS instruction. Finally, it aborts any transactions in the overflow reader list of the freshly acquired object. It is possible for a reader to enter the list after the acquirer finishes requesting permission to abort readers. In such circumstances, the late-arriving reader will be aborted without arbitration, which ensures correctness, though not fairness.

At the end of a transaction, a thread issues a CAS-Commit to change its state from ACTIVE to COMMITTED (or ABORTED, in which case the transaction can be retried).

RTM uses software to detect and resolve transaction conflicts. Two transactions conflict only if they access the same object and at least one of them attempts to write it. In RTM this conflict is not visible until the writer acquires the object. Under eager conflict detection, acquisition occurs at open time, and read-write and write-write sharing are precluded. A writer aborts any extant readers, and once there is a writer, subsequent readers and writers must abort the eager writer before they can access the object. In contrast, under lazy conflict detection, acquisition is deferred until commit time, and read-write and write-write sharing are permitted. Eager acquisition results in less overall bookkeeping since it doesn't require a final acquire phase, making it faster for workloads in which aborts are rare. It may also avoid useless work by aborting a doomed transaction early. Lazy acquisition, by contrast, avoids the possibility of aborting a transaction in favor of a competitor that is subsequently unable to commit. It also allows a writer and one or more concurrent readers to all commit, so long as the readers do so first. When conflicts are detected, RTM uses a software contention manager to decide which transaction should continue, and which should wait or abort. Contention management policies are the subject of much ongoing research; we currently support eight common policies, as well as others of our own design. In a typical hardware TM system (e.g., LogTM), contention management is embedded in the cache coherence protocol. It is performed by the controller that owns the line, based on the limited information available to that controller, while the requesting process blocks waiting for a response. In RTM, contention management is performed by nonblocking software, executed by the thread that discovers the conflict, using whatever information the runtime designer deems useful.

Data copying can be eliminated in the following manner. A fast-path transaction calls begin_t inside the BEGIN_TRANSACTION macro. Subsequent TStores will be buffered in the cache, and will remain invisible to other threads until the transaction commits. As noted previously, open_RW returns a pointer to the current version of an object when invoked by a fast-path transaction, thereby enabling in-place updates. Programmable data isolation thus avoids the need to create a separate writable copy, as is common in software TM systems (RSTM among them). When a fast-path transaction acquires an object, it writes a NULL into the New pointer, since the old pointer is both the last and next valid version. As a result, when a fast-path transaction aborts, it does not need to clean up the Owner pointers in objects it has acquired; because the owner has been working directly on the Old version of the data, a newly arriving transaction that sees mismatched serial numbers will read the appropriate version.

In most software TM systems, a transaction may be doomed to fail (because of conflicting operations in committed peers) well before it notices its fate. In the interim it may read versions of objects that are mutually inconsistent. This possibility raises the problem of validation: a transaction must ensure that inconsistent data never cause it, erroneously, to perform operations that cannot be rolled back. In general, a transaction must verify that all its previously read objects are still valid before it performs any dangerous operation. The resulting overhead can be a major component of the cost of software TM: making readers visible to writers requires metadata updates that induce large numbers of cache misses; leaving them invisible leads to $O(n^2)$ total cost for a transaction that reads n objects.

Bookkeeping and validation costs can be reduced in the following manner. Whenever an object is read (or opened for writing with lazy acquire), the transaction uses ALoad to mark the object's header in the local cache. Since transactions cannot commit changes to an object without modifying the object header first, the remote acquisition of a locally ALoaded line results in an immediate alert to the reader transaction. Since the header must be read in any case, the ALoad induces no extra overhead. Freed of the need to explicitly validate previously opened objects, software can also avoid the bookkeeping overhead of maintaining those objects on a list. Best of all, perhaps, a transaction that acquires an object implicitly aborts all fast-path readers of that object simply by writing the header: fast-path readers need not add themselves to the list of readers in the header, and the O(t) cost of aborting the readers is replaced by the broadcast invalidation already present in the cache coherence protocol.

One extra complication arises from programmable data isolation: since committing a fast-path writer updates written objects in-place, we must ensure that a transaction in overflow mode also notices immediately when it is aborted by a competitor. We therefore require that every transaction ALoad its own descriptor. If a competitor CAS-es its status to ABORTED, the transaction will suffer an alert, avoiding the possibility that it will read mutually inconsistent data from within a single object.

Like most hardware TM proposals, fast-path RTM transactions are bounded by space and time constraints. They cannot ALoad or TStore more lines than the cache can hold, and they cannot execute across a context switch, because we do not (currently) associate transaction IDs with tagged lines in the cache. To accommodate transactions that exceed these time and space bounds, RTM provides an overflow mode with only one hardware requirement: that the transaction's ALoaded descriptor remain in the cache whenever the transaction is running.

Speculative loads and stores can be disabled in the following manner. In principle, a transaction that exceeds the capacity of the cache could continue to use the available space for as many objects as fit. For the sake of simplicity we do not currently pursue this possibility. Rather, a transaction that suffers a "no more space" alert aborts and retries in overflow mode. In this mode it leaves the % t_in_flight bit clear, instructing the hardware to interpret TLoad and TStore instructions as ordinary loads and stores. This convention allows the overflow transaction to execute the exact same code as fast-path transactions; there is no need for a separate version. Without speculative stores, however, the overflow transaction must clone objects it intends to write. When objects are acquired, the WCAS instruction writes the address of the clone into the New field of the metadata. When transactions encounter a header whose last Owner is committed and whose New field is non-null, they return the New version as the current valid version.

ALoads can be limited in the following manner. Since overflow transactions can run concurrently with fast-path transactions, they must abort whenever objects they are reading are overwritten. Though an overflow transaction cannot ALoad every object header it reads, it still ALoads its own descriptor. It also writes itself into the Overflow Reader list of every object it reads; this ensures it will be explicitly aborted by any writers on those objects.

Cloning and consistency are handled in the following manner. While only one ALoaded line is necessary to ensure immediate aborts and to handle validation, using a second ALoad can improve performance when a fast-path transaction and an overflow transaction are concurrent writers. If the overflow writer is cloning an object when the fast-path writer commits, the clone operation may return an internally inconsistent object. If the overflow transaction becomes a visible reader first, the problem is avoided. It is simpler, however, to ALoad the header and then clone the object. If another transaction commits changes, the clone operation will suffer an alert. We assume in our experiments that the hardware is able (with a small victim cache) to prefer non-ALoaded lines for eviction, and to keep at least two in the cache.

Context switches are supported in the following manner. To support transactions that must be preempted, we require two actions from the operating system. When it swaps a transaction out, the operating system flash clears all the A tags. In addition, for transactions in fast-path mode, it executes the abort instruction to discard isolated lines. When it swaps the transaction back in, it starts execution in a software-specified restart handler (separate from the alert handler). The restart handler aborts and retries if the transaction was in fast-path mode or was swapped out in mid-clone; otherwise it re-ALoads the transaction descriptor and checks that the transaction status has not been changed to ABORTED. If this check succeeds, control returns as normal; otherwise the transaction jumps to its abort code.

While both alert-on-update and programmable data isolation can improve the performance of TM, alert-on-update is a much smaller change to existing cache designs—an ALoad-capable processor can, in fact, be pin compatible with existing hardware. An analysis of overheads in software TM also suggested that alert-on-update alone could yield significant performance gains. We therefore designed a system, called RTM-Lite that relies on this mechanism only.

Like a fast-path RTM transaction, an RTM-Lite transaction ALoads the headers of the objects it reads. It does not add itself to Overflow Reader lists. Since TStore is not available, however, it must clone every acquired object. At the same time, it never has to worry about in-place updates, so immediate aborts are not required. This avoids some complexity in the run-time system: the alert handler simply sets the descriptor to ABORTED and returns. A transaction checks its status on every API call, but this takes constant time: in comparison to RSTM, validation requires neither a cache-miss-inducing change to a visible reader list nor an O(n) check of n previously-opened objects.

As it turns out, RTM-Lite transactions resemble RSTM transactions more closely than they resemble either fast-path or overflow transactions in RTM. In recognition of this fact, we created the RTM-Lite code base by adding ALoads to RSTM and removing validation, rather than by removing in-place update from RTM. As a result, RTM-Lite shares some additional, incidental similarities to RSTM: Instead of using a Wide-CAS to update multiple header fields atomically, RTM-Lite moves several fields into the data object and requires an extra level of indirection to read an object whose owner has aborted. Instead of using serial numbers to recognize re-used descriptors, RTM-Lite requires both committed and aborted transactions to clean up Owner pointers in acquired objects.

Every RTM-Lite transaction keeps an estimate of the number of lines it can safely ALoad. If it opens more objects than this, it keeps a list of the extra objects and validates them incrementally, as RSTM does. If it suffers a "no more space" alert, it reduces its space estimate, aborts, and restarts. On a context switch, RTM-Lite transactions abort and restart as RSTM transactions.

We will now present experimental results to evaluate the following: that the RTM hardware can be effectively used to speed a software TM system, that policy flexibility is important, and that our hybrid design permits a heterogeneous mix of fast-path and overflow transactions without impeding throughput.

We evaluate RTM through full system simulation of a 16-way chip multiprocessor (CMP) with private split L1 caches and a shared L2. We use the GEMS/Simics infrastructure, a full system functional simulator that faithfully models the SPARC architecture. The instructions specified above are called through the standard Simics "magic instruction" mechanism. We implemented the TMESI protocol and alert-on-update mechanism using the SLICC framework to encode all the stable and transient states in the system. We employ GEMS's network model for bus and switch contention, using the parameters in Table 4 below.

TABLE 4

Target System Parameters
16-way CMP, Private L1, Shared L2

| | |
|---|---|
| Processor Cores | 16 1.2 GHz in-order, single issue, ideal IPC = 1 |
| Private L1 Cache | 64 kB 4-way split, 64-byte blocks, 1 cycle latency, 32-entry victim buffer |
| Shared L2 Cache | 8 MB, 8-way unified, 64-byte blocks, 4 banks, 20 cycle latency |
| Memory | 2 GB, 100 cycle latency |
| Interconnection Network | 4-ary totally ordered hierarchical tree, 1 cycle link latency, 64-byte links |

A workload description is given in Table 5 below.

TABLE 5

Workload Description

HashTable: Transactions use a hash table with 256 buckets and overflow chains to lookup, insert, or delete a value in the range 0 . . . 255 with equal probability. At steady state, the table is 50% full.
RBTree: In the red-black tree (RBTree) benchmark, transactions attempt to insert, remove, or delete values in the range 0 . . . 4095 with equal probability. At steady state there are about 2048 objects, with about half of the values stored in leaves.
RBTree-Large: This version of the RBTree benchmark uses 256-byte tree nodes to increase copying overheads. Transactions only modify a small percent of the fields of the node.
LFUCache: LFUCache uses a large (2048) array based index and a smaller (255 entry) priority queue to track the most frequently accessed pages in a simulated web cache. When re-heapifying the queue, transactions always swap a value-one node with a value-one child; this induces hysteresis and gives each page a chance to accumulate cache hits. Pages to be accessed are randomly chosen using a Zipf distribution: $p(i) \propto \Sigma_{0<j<i} j^{-2}$
LinkedList-Release: In the LinkedList-Release benchmark, early release is used to minimize read-set size while performing inserts, lookups, and deletes into a sorted, singly-linked list holding values in the range 0 . . . 255.
RandomGraph The RandomGraph benchmark requires transactions to insert or delete vertices from an undirected graph represented with adjacency lists. Edges in the graph are chosen at random, with each new vertex initially having up to 4 randomly selected neighbors.

Simics allows us to run an unmodified Solaris 9 kernel on our target system with the "user-mode-change" and "exception-handler" interface enabling us to trap user-kernel mode crossings. On crossings, we suspend the current transaction context and allow the OS to handle TLB misses, register-window overflow, and other kernel activities required by an active user context in the midst of a transaction. On transfer back from the kernel we deliver any alert signals received during the kernel routine, triggering the alert handler as needed. On context switches, we simulate the execution of the simple software handlers described above.

Figure 5:
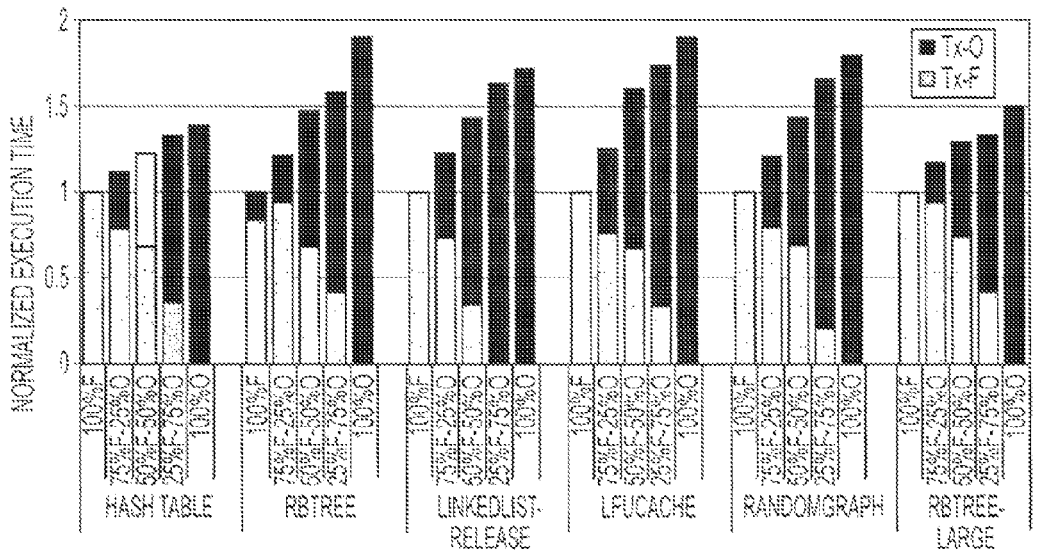
FIG. 5 shows a breakdown of time spent in fast-path and in overflow mode, normalized to the all-hardware execution (16 threads)

We consider the six benchmarks listed in FIG. 5, designed to stress different aspects of software TM. In all benchmarks, we execute a fixed number of transactions in single-thread mode to ensure that the data structure is in a steady state. We then instruct each thread to execute a fixed number of transactions concurrently, to evaluate throughput and scalability.

To evaluate runtime systems, we evaluate each benchmark with two RTM configurations. RTM-F always executes fast-path transactions to extract maximum benefit from the hardware; RTM-O always executes overflow transactions to demonstrate worst-case throughput. We also compare RTM to the freely-available RSTM package and the RTM-Lite runtime described above, which uses ALoad to optimize the RSTM library. As a baseline we compare against a coarse-grain locking library (CGL), which enforces mutual exclusion by mapping the BEGIN- and END-TRANSACTION macros to acquisition and release of a single coarse-grain test-and-test-and-set lock.

To ensure a fair comparison, we use the same benchmark code, memory manager, and contention managers in all systems. For contention management we use the Polka manager (described in the above-cited Scherer and Scott Las Vegas paper) unless otherwise specified.

The only exception to our code reuse is for simulating TLoad and TStore without compiler support. We modified the allocator to segregate the heap and construct all shared object payloads in high address ranges. Memory management proceeds as in all other systems, but our simulator treats all memory operations on high addresses as tloads and tstores.

Throughput and latency will now be considered. FIGS. 2A-2F present the normalized throughput (transactions per second) for all benchmark and runtime combinations. We only consider eager transactions, and results are normalized to single-thread CGL performance, except for Random-Graph, which is normalized to single-thread RSTM performance RTM-F, RTM-O, RTM-Lite, and RSTM demonstrate similar scaling behavior across all benchmarks; RTM-F and RTM-Lite appear to successfully leverage our hardware to achieve up to a ~5× speedup at one thread, and consistently better performance at all thread levels, in comparison to RSTM.

Figure 3:
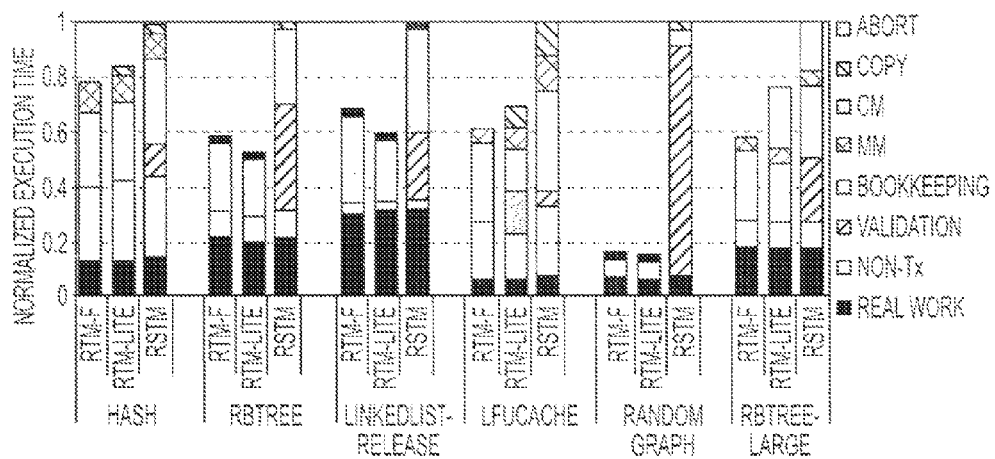
FIG. 3 shows a breakdown of single-thread transaction latency, normalized to single-thread RSTM.

To gain further insight into the improvements of RTM and RTM-Lite over RSTM, FIG. 3 presents a breakdown of single thread execution time. The segments of each bar reflect time spent in various portions of user and API code. Real Work expresses time in user-provided code between the BEGIN- and END-TRANSACTION macros (time in user code outside of these macros is Non-Tx). Validation records any time spent by the runtime explicitly validating its read set, and Copy reflects time spent making clones of objects. MM records time spent in memory management. Since the individual metadata manipulations and bookkeeping operations occur at a very fine granularity, we include all time for these operations in Bookkeeping. For these single-thread runs, no time is spent on aborted transactions or contention management. As the breakdowns show, RTM and RTM-Lite appear to successfully leverage ALoad to eliminate RSTM's validation overhead without a significant increase in bookkeeping. RTM is also able to eliminate the copying costs. Due to the small object sizes for most of the benchmarks (other than RBTree-Large), this gain is usually dwarfed by other overheads Similar analysis at other thread levels continues to show these benefits, although increased bus contention and cache misses, as well as limited concurrency in some benchmarks, cause increased latency for all components of the timing breakdown.

HashTable: Since transactions are short (at most 2 objects read and 1 written) and conflicts are rare, the HashTable exhibits embarrassing parallelism: even RSTM is able to scale to a higher throughput than single-thread CGL. However, these properties prevent hardware from offering much additional benefit. The cost of copying is small, and since the read set is also small, the validation savings over RSTM are modest, resulting in about a 30% improvement.

RBTree: Tree rebalancing ensures that there are some conflicts in RBTree, while keeping the read and write sets above 10 and 3 objects, respectively. Validation is a significant overhead, and consequently ALoad enables RTM-F and RTM-Lite to double the performance of RSTM. All TMs demonstrate ~10× speedup from 1 to 16 threads, and ALoad-assisted TMs are able to perform nearly twice as fast as CGL's peak despite starting off ~5× slower at one thread.

RBTree-Large: RBTree-Large shows similar scaling behavior to RBTree, but RTM-F is able to leverage TLoad and TStore to eliminate long copy operations. RTM-Lite improves performance by ~25% over RSTM by eliminating validation. RTM-F further improves performance by another ~20% by reducing the copying overhead.

LFUCache: Due to the Zipf distribution used to choose which page to hit, there is virtually no concurrency in LFU-Cache, and all TMs flat-line as threads are added. Using ALoad allows RTM-F and RTM-Lite to outperform RSTM, but CGL's peak performance is still ~3× higher.

LinkedList-Release: The use of early release keeps conflicts low, resulting in a high level of concurrency (~10× speedup at 16 threads for all TMs). However, the high cost of metadata manipulation and bookkeeping (on average 64 objects are read and 62 released) keeps any TM from outperforming CGL's peak. At 16 threads, RTM and RTM-Lite achieve about 60% of CGL's single-thread performance.

RandomGraph: Transactions in RandomGraph are complex; they read hundreds of objects, write tens of objects, and conflict with high probability. Validation is expensive and aborts are frequent. By leveraging ALoad, RTM-F and RTM-Lite can outperform RSTM by a factor of 5 at one thread Similarly, RTM-O's use of a visible reader list enables it to avoid validation and dramatically outperform RSTM, although the two perform comparably when RSTM is configured to use visible reads. When there is any concurrency, however, the choice of eager acquire causes all TMs to live-lock with the Polka contention manager. This livelocking behavior can be avoided by using a Greedy contention manager, modified to support invisible reads. Using Greedy, all TM's flat-line in RandomGraph as threads are added.

In order to evaluate the advantages of policy flexibility, we varied the conflict detection policy between eager and lazy. FIGS. 4A-4D present the results for HashTable, RBTree, LFUCache, and RandomGraph using 16 threads.

The HashTable and RBTree benchmarks demonstrate that in benchmarks that exhibit parallelism, the choice of conflict detection policy has a measurable effect. In HashTable, where conflicts are extremely rare, lazy acquire adds extra bookkeeping instructions without improving conflict resolution, resulting in a constant performance degradation that exceeds 15% for 16 threads. Similarly, RBTree suffers from the extra bookkeeping at low thread counts; at high thread counts, however, the use of lazy acquire enables RBTree to scale slightly better than eager acquire, ultimately achieving a 10% speedup.

As in RBTree, lazy transactions are slower than eager transactions in LFUCache at low thread levels due to extra bookkeeping. Since LFUCache admits no concurrency, eager acquire hurts performance at higher thread levels. As soon as an eager transaction calls open_RW on an object, it is vulnerable to conflicts with other threads. Since the likelihood of another thread trying to use the same object is high, increased concurrency decreases the likelihood of that transaction committing by a small factor. In contrast, lazy acquire actually improves performance We expect that lazy acquire would not degrade due to contention; conflicts are only visible at the point where one transaction attempts to commit, and at that commit point conflicts are usually only realized between writers on the same object. Since the conflicting transactions are both about to commit, the likelihood of the conflict "winner" ultimately failing is low. The improvement in throughput with lazy acquire despite LFUCache's lack of concurrency is due to the ability to overlap one processor's transactional work with another processor's non-transactional work.

Figure 4A:
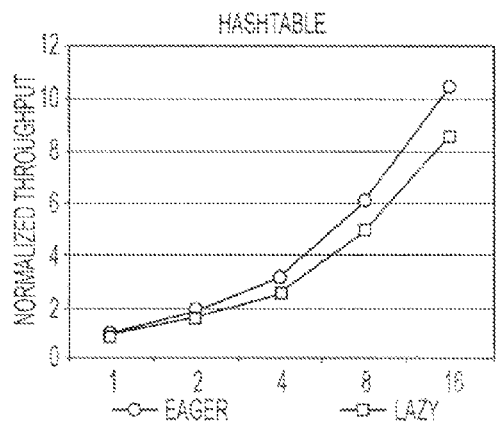
FIGS. 4A-4D show an eager vs. lazy conflict detection comparison, normalized to RTM Eager, one thread, as the number of threads is increased.
Figure 4B:
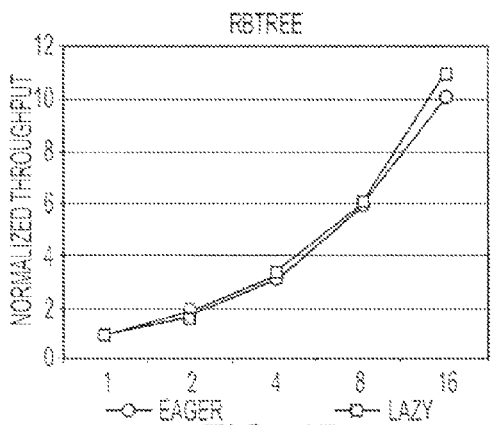
Figure 4C:
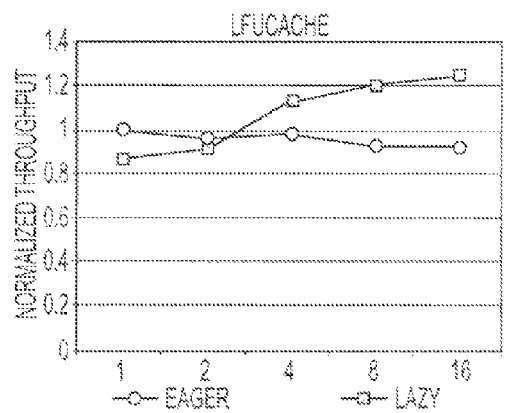
Figure 4D:
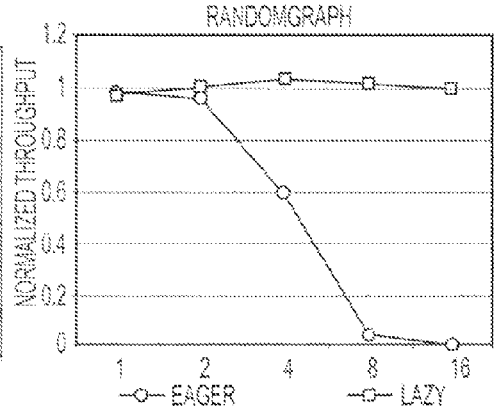

On RandomGraph, we had earlier noted that at high thread levels all TM systems livelocked under eager acquire. FIG. 4D shows that lazy acquire avoids this pathological situation. RandomGraph transactions usually open_RW at least one highly contended object early, and then continue to read and write multiple objects. Since transactions run for tens of thousands of instructions, the likelihood of another transaction detecting and winning a conflict on the contended object is high under eager acquire. Unfortunately, that winner transaction is also likely to be aborted before reaching its commit point, for the same reason. With lazy acquire, this situation is avoided since conflicts are only detected at the very end of transactions. As in LFUCache, the winner of a conflict is unlikely to be aborted, unless it is by another transaction that is also about to commit The consequences of this property are more dramatic than in LFUCache because the transactions are larger in space and time.

To summarize, even on a small set of benchmarks we find that neither lazy nor eager acquire is a silver bullet. Lazy demonstrates some desirable characteristics, and eager generally performs best at very low thread counts, but neither strategy consistently offers better performance at high thread levels.

We expect overflow transactions to occur rarely, with most transactions running in a short amount of time and fitting in the L1 cache. However, we must be sure that the occasional overflow transaction does not slow down fast-path transactions. FIG. 5 reports a set of experiments designed to measure this effect.

We run 16 threads all using lazy acquire. Each time a thread commits, it decides whether its next transaction should be run as overflow or fast-path using a uniform probability distribution. We vary the probability between 0 and 1 in increments of 0.25. Total execution time is measured, as well as the percentage of total execution time spent in fast-path transactions.

If we let $T_f$ be the time required to execute a fast-path transaction, and we let $T_o$ be the time required to execute an overflow transaction, then for a given probability $P_o$ that a thread runs as overflow, the total execution time should be $T_f \times (1-P_o) + T_o \times P_o$. In our experiments, we found that on average our results were within 4% of this predicted execution time, with the highest outlier only 7% above expected and the lowest outlier 6% below expected.

The various protocols described above will now be described in further detail.

Figure 6:
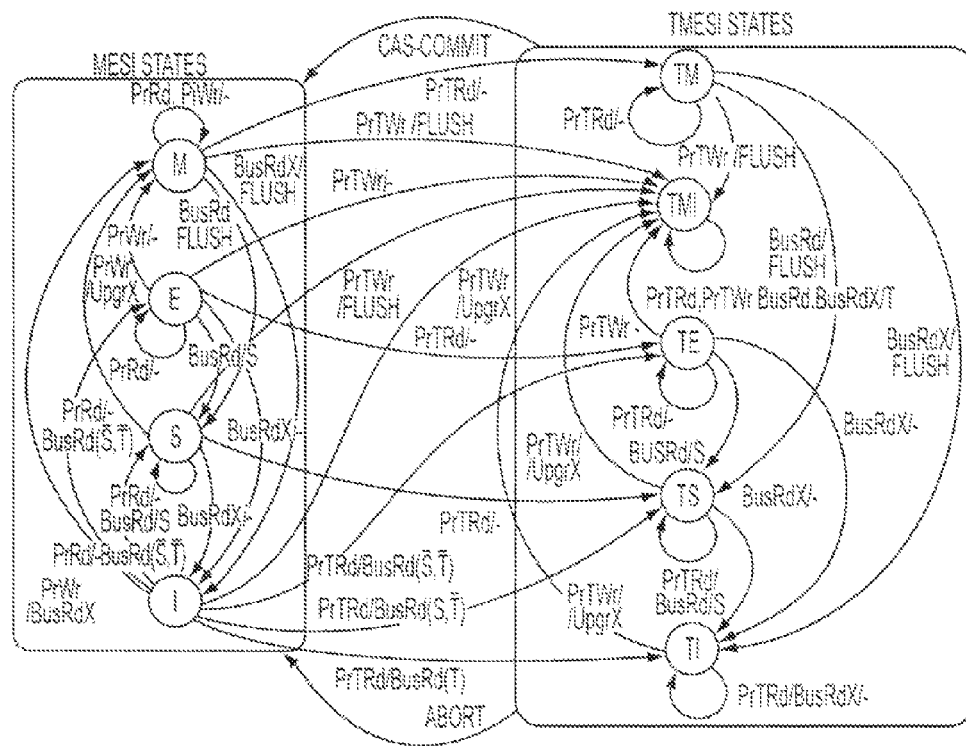
FIG. 6 shows the TMESI (Transactional MESI) protocol.

FIG. 6 contains the transition diagram for the stable states of the TMESI protocol, with transactional tags for TM, TE, and TS states. Orthogonal A bits are not shown.

Dashed boxes enclose the MESI and TMESI subsets of the state space. In the wake of a CAS-Commit, TM, TE, TS, and TI revert to M, E, S, and I, respectively; TMI reverts to M if the CAS-Commit succeeds, or to I if it fails. Notation on transitions is conventional: the part before the slash is the triggering message; after is the ancillary action ('—' means none). "Flush" indicates that the cache writes the line out to the bus. S and T indicate signals on the "shared" and "threatened" bus lines respectively. Plain, they indicate assertion by the local processor; parenthesized, they indicate the signals that accompany the response to a BusRd request. An overbar means "not signaled". For simplicity, we assume that the base protocol prefers memory—cache transfers over cache—cache transfers. In all cases, a cache responds to Upgr (upgrade to M) requests the same way it responds to BusRdX messages.

Figure 7:
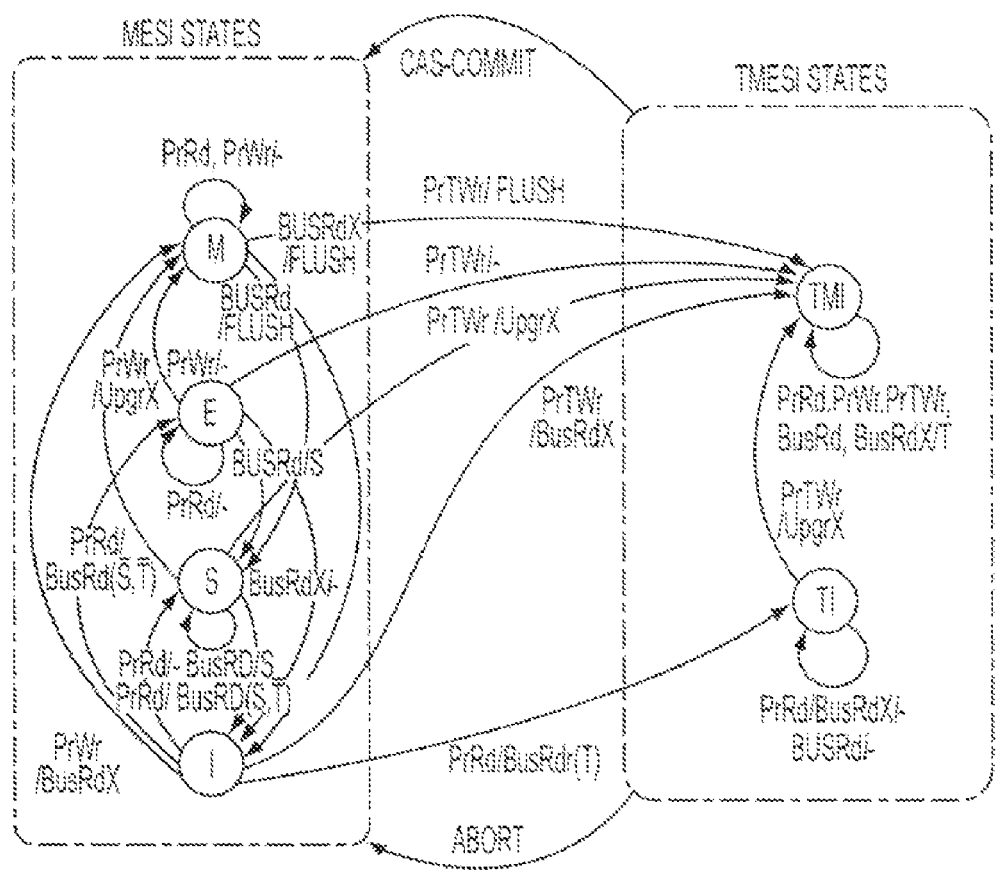
FIG. 7 shows a simplified TMESI protocol.

FIG. 7 contains the transition diagram for the stable states of the simplified TMESI protocol alluded to above. By omitting the transactional tags for TM, TE, and TS states, we obtain a significantly simpler protocol, at the cost of reloading lines that are read twice in the same transaction, and are threatened (for the first time) in between. As in FIG. 6, orthogonal A bits are not shown.

Figure 8:
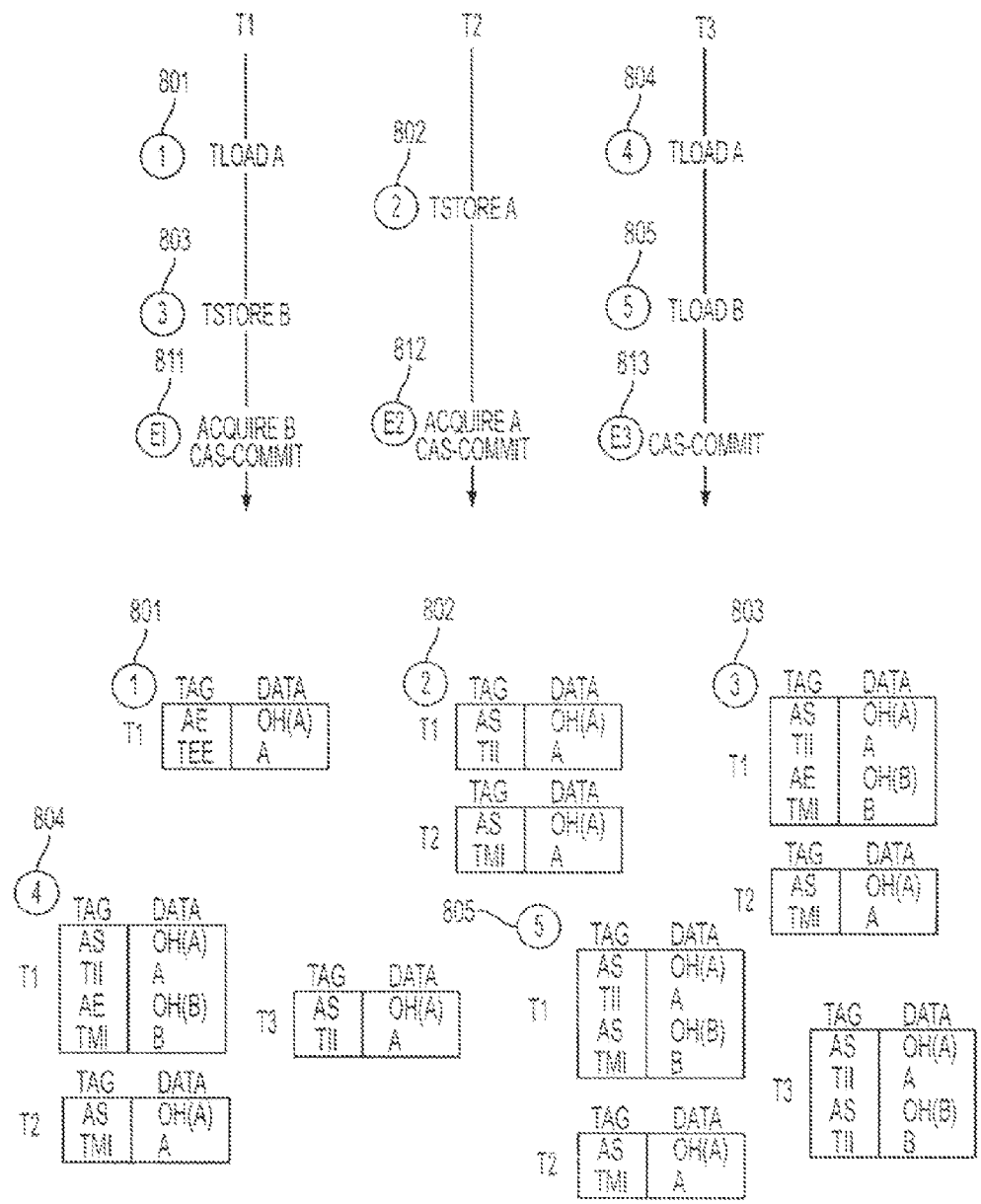
FIG. 8 shows an example of execution of transactions.

FIG. 8 illustrates the interactions among three simple concurrent transactions, with the interleaving of accesses with lazy acquire at the top and cache tag arrays at various points in time at the bottom. OH(x) indicates the header of any object x. Only the transactional instructions are shown. Numbers indicate the order in which instructions occur. At the beginning of each transaction, RTM software executes a set_handler instruction, initializes a transaction descriptor (in software), and ALoads that descriptor. Though the open calls are not shown explicitly, RTM software also executes an ALoad on each object header at the time of the open and before the initial TLoad or TStore. We use AM, AE, and AS to indicate MESI states with the A bit set.

Let us assume that initially objects A and B are invalid in all caches. At transaction 801, T1 performs a TLoad of object A. RTM software will have ALoaded A's header into T1's cache in state AE (since it is the only cached copy) at the time of the open. The referenced line of A is then loaded in TE. When the store happens in T2 at 802, the line in TE in T1 sees a BusRdX message and drops to TI. The line remains valid, however, and T1 can continue to use it until T2 acquires A (thereby aborting T1) or T1 itself commits Regardless of T1's outcome, the TI line must drop to I to reflect the possibility that a transaction threatening that line can subsequently commit.

At 803, T1 performs a TStore to object B. RTM loads B's header in state AE at the time of the open, and B itself is loaded in TMI, since the write is speculative. If T1 commits, the line will revert to M, making the TStore's change permanent. If T1 aborts, the line will revert to I, since the speculative value will at that point be invalid.

At 804, transaction T3 performs a TLoad on object A. Since T2 holds the line in TMI, it asserts the T signal in response to T3's BusRd message. This causes T3 to load the line in TI, giving it access only until it commits or aborts (at which point it loses the protection of software conflict detection). Prior to the TLoad, RTM software will have ALoaded A's header into T3's cache during the open, causing T2 to assert the S signal and to drop its own copy of the header to AS. If T2 acquires A while T3 is active, its BusRdX on A's header will cause an invalidation in T3's cache and thus an immediate abort of T3.

Event 805 is similar to 804, and B is also loaded in TI.

We now consider the ordering of events 811, 812, and 813.

1. 811 happens before 812 and 813: When T1 acquires B's header, it invalidates the line in T3's cache. This causes T3 to abort. T2, however, can commit When it retries, T3 will see the new value of A from T1's commit.

2. 812 happens before 811 and 813: When T2 acquires A's header, it aborts both T1 and T3.

3. 813 happens before 811 and 812: Since T3 is only a reader of objects, and has not been invalidated by writer acquires, it commits. T2 can similarly commit, if E1 happens before E2, since T1 is a reader of A. Thus, the ordering E3, E1, E2 will allow all three transactions to commit TCC would also admit this scenario, but to the best of our knowledge no other hardware TM scheme would do so, because of eager conflict detection. RTM enforces consistency with a single BusRdX per object header. In contrast, TCC must broadcast all speculatively modified lines at commit time.

Alert-on-update has the following non-transactional uses. As noted above, alert-on-update could be used for any task that benefits from fine-grain access control. To maximize its flexibility, we propose two variants of the ALoad instruction: The first, as described above, generates an alert when the line is evicted from the cache. The second also generates an alert if the line is written or, optionally, read locally.

Fast User-space Mutexes: The low latency of alert signals shifts the tradeoff between spinning and yielding on lock acquisition failure, especially in the case of user-level thread packages. Ideally, a thread T would yield immediately when it fails to acquire lock L, and would wake immediately when L is released. To approximate this behavior, we need only prefix the acquire attempt with an ALoad of the lock. Then, on lock failure, T can yield without ARelease-ing the line. On a subsequent alert the handler would switch back to T. In this manner no cycles are wasted spinning on an unavailable lock, and no bus traffic is generated by multiple unsuccessful acquire attempts.

For optimal performance, the thread package may specify that the alert handler attempts to acquire L on T's behalf when an alert is given. This ensures the lowest latency between the release of L and its acquisition by T. Additionally, if L is acquired by T0 before the alert handler can acquire it for T, the thread switch to T can be avoided. Furthermore, using the variant of ALoad that also generates alerts for local writes, this method is appropriate regardless of whether the lock holder and failing acquirer reside on the same processor or separate processors. This technique is useful both with and without transactions, and thus is more general (and carries less overhead due to transaction rollback) than a similar proposal by Zilles and Baugh.

Asynchronous Message Handling: Communication mechanisms (e.g., Active Messages) in which messages are received asynchronously generally require either user-level polling or remote interrupts and operating system intervention, both of which are expensive. By ALoading a "doorbell" location, a thread can provide its message-passing peers with a simple, efficient way to notify it when a message buffer has been filled and is ready for receipt.

Fast Rollback in Nonblocking Algorithms: Many nonblocking algorithms have distinct phases: first a shared location is read, then a new value is computed for the shared location, and finally the thread attempts to CAS the new value in place of the old value. When the value of the shared location changes during the middle of the computation phase, the computing thread is doomed to abort, but cannot detect its fate without continuous polling.

To avoid both polling and wasted work, a thread might ALoad the shared location, and register an alert handler that restarts the operation immediately. Using this idiom, if the location changes the thread will immediately discard its wasted effort and return to the phase in which it reads the shared location. Depending on the complexity of the computation in the second phase, the alert handler may wish to throw an exception, issue a longjmp( ), or simply execute an unconditional branch. This technique is applicable not only to nonblocking algorithms, but also to read-copy-update algorithms and many software TM systems. It is likely that rollback will entail more than a simple jump instruction for these applications, since they are likely to allocate deep data structures during their computation phase.

Hazard Pointers: Compare-and-swap instructions are susceptible to the "ABA" problem, in which thread T1 reads L==A and then CASes L to Z, but in the meantime two other CASes are issued by other threads, changing L from A to B and back to A again. In algorithms that require that L remain constant from the first read by T1 to the final CAS, more complicated measures such as hazard pointers have been proposed.

We observe, however, that the fast rollback technique described above solves the ABA problem implicitly. Any change to L will result in an alert to T1, and the absence of any alert between the initial read of L and the moment when T1 CASes L from A to Z indicates that there was no ABA risk. Depending on the implementation of CAS, this technique might result in unnecessary alerts. In particular, it is common for the CAS microcode to begin with a get-exclusive bus message. Thus if L is not A when T1 tries to execute CAS(&L, A, Z), the CAS will still cause remote processors to take an alert on L. For highly contended locations, we suspect that a software test-and-CAS operation, which loads L, compares L to A, and conditionally issues a hardware CAS only if L==A would effectively mitigate this risk without requiring an additional hardware instruction.

Debugging: Modern microprocessors currently provide limited support for debuggers through watchpoint registers. On the x86, for example, there are 4 debug registers which may be used to monitor memory regions of 1, 2 or 4 contiguous bytes. With pervasive parallelism, four debug watchpoints registers may not be enough. Alert-on-update (the variant that also generates alerts on local writes) allows the debugger to set watchpoints at only coarser cache-line granularity but supports a larger number of watchpoints, up to the size of the cache.

More recently Lu et al. (S. Lu, J. Tucek, F. Qin, and Y. Zhou. AVIO: Detecting Atomicity Violations via Access Interleaving Invariants. In *Proc. of the 12th Intl. Conf. on Architectural Support for Programming Languages and Operating Systems*, San Jose, Calif., October 2006) describe "AVIO", a statistical invariant defining technique used to detect atomicity violations. They explore hardware support for the AVIO system, which tracks the preceding access instruction type and remote downgrade requests. It is conceivable that alert-on-update could support AVIO type techniques. Alert-on-update implicitly indicates that the most recent access was either a local read/write or a remote read. AVIO also tracks in hardware the most recent downgrade request. With AOU these would be tracked in software by the alert handler.

Code Security: Due to the fine (cache line) granularity of the alert-on-update mechanism, it is suitable for detecting and reacting to memory corruption in settings where page-based detection mechanisms are either too expensive or too space-inefficient.

Buffer Overflows: In order to detect buffer overflows in legacy code, a program could ALoad portions of its stack. A particularly appealing technique, inspired by the DieHard system of Berger and Zorn, is to use randomization across installations of an application: the compiler could choose a random number of cache lines of buffering between stack frames at compile time, and then ALoad those empty lines as part of the function prologue.

Since the size of the padding is known at compile time, parameter passing via the stack would not be compromised, but the randomization of the padding across builds of the program would increase the likelihood that an attacker could not attack multiple installations of a program with the same input. To do so would very likely result in an alert-based detection for at least one installation, thereby revealing the buffer vulnerability.

Read-Only Fields and Methods: At compile time, one might order the fields of a class so that all const member fields are adjacent. Then the object constructor could ALoad that line immediately after initialization. In this manner, software could quickly detect when memory safety is violated. In a similar manner, if a method is const, then it would be possible in the function prologue to ALoad the lines corresponding to the entire class's representation in memory, to detect when member functions discard const pointers.

Notification on Dynamic Code Modification: Another appealing use of ALoad is to permit fine-grained protection of code pages. Although the majority of applications do not require the ability to dynamically modify their code, and are well served by using page-level protection, there is no mechanism by which applications that modify their own code pages can ensure that malicious code does not make unauthorized modifications.

With ALoad however, a program could set the alert bits of code pages, and then use a private signature field to indicate to the alert handler when the application is making a safe modification to its code. If the alert handler is invoked and the private signature matches a hash of the address causing the alert, the handler can safely assume that the alert was caused by a trusted operation. If the alert handler detects a signature conflict, it can assume that the code pages are being modified by an untrusted agent, and can raise an appropriate exception.

Like Alert-on-Update, Programmable Data Isolation can be used for purposes other than transactional memory, though the opportunities do not appear to be as extensive as those listed above. As noted by designers of hardware TM systems, possibilities include (1) ordered, thread-level speculation, and (2) speculative execution in sequential programs for reliability or exception rollback. The chief difference here between previous implementations and one based on programmable data isolation would be the option, with the latter, of rolling back a selected subset of a program's data, leaving updates of other data visible.

Figure 9:
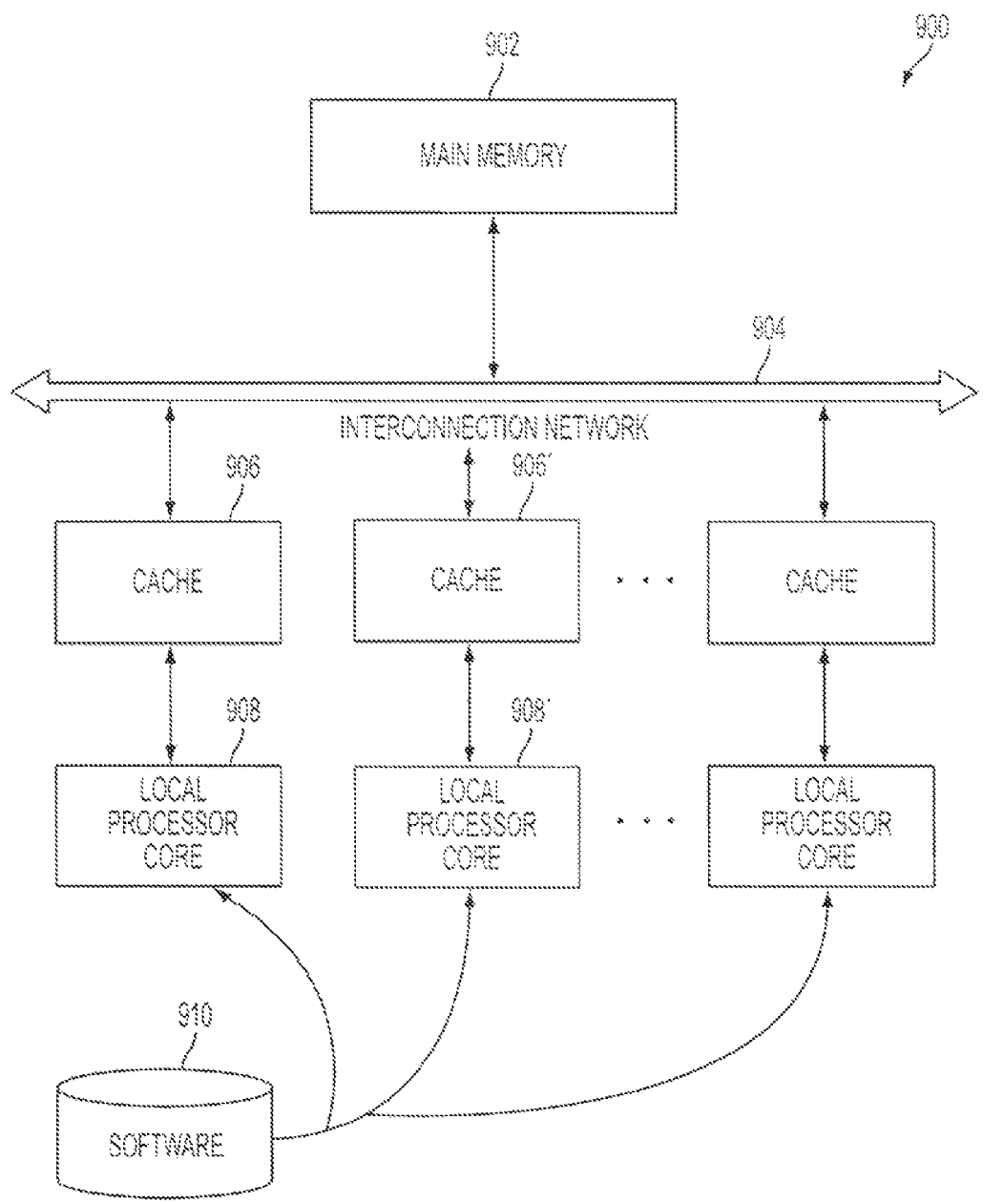
FIG. 9 shows an example of the hardware.

An overview of an example of the hardware on which the invention can be implemented is shown in FIG. 9 as 900. Main memory 902 is in communication via an interconnection network 904 with a collection of caches 906, 906', . . . , which also communicate with one another according to a cache coherence protocol. Each cache is under the control of a local processor core 908, 908', . . . . The software 910 can be supplied to the local processor on any suitable medium.

While a preferred embodiment of the invention has been set forth above, those skilled in the art who have reviewed the present disclosure will readily appreciate that other embodiments can be realized within the scope of the invention. For example, other possible embodiments of the invention include simplified protocols (without transactional loads); implementations for other coherence protocols (e.g. MOESI or directory-based); additional or altered hardware assists (e.g. Store-Conditional-Commit instead of CAS-Commit); nested transactions; gradual fall-back to software, with ongoing use of whatever fits in cache; other styles of RTM software (e.g., word-based, blocking, and/or indirection-free); context identifiers for transactions implemented at a shared level of cache; and various real-world applications. Therefore, the present invention should be construed as appended only by the appended claims.

We claim:

1. A method for decoupling monitoring and detection of activity on a memory location from a corresponding reaction, the method comprising:
   (a) indicating an address of a software alert handler for each thread that is interested in monitoring remote access to memory;
   (b) indicating, for each such thread, memory locations to be monitored for remote writes or eviction from a local cache;
   (c) effecting in hardware an immediate subroutine call to the software alert handler of a thread that is interested in monitoring remote access to memory when a remote write or an eviction from the local cache occurs; and
   (d) determining in the software alert handler how to respond to the remote write or eviction from the local cache.

2. The method of claim 1, wherein if the number of memory locations in which a thread indicates interest exceeds the marking capacity of the hardware, the thread is caused to call its alert handler with an indication that said capacity has been exceeded.

3. The method of claim 1, further comprising response to local writes and, optionally, reads:
   (e) receiving indications from each interested thread of the memory locations for which local writes and, optionally, reads are to be monitored;
   (f) effecting in hardware, in each interested thread, an immediate subroutine call to the software alert handler of the thread when a local write or read of a memory location indicated by the thread is detected and;
   (g) determining in the software alert handler how to respond to the detected local write or read.

4. The method of claim 1, further comprising a software transactional memory process in which
   (e) each thread indicates interest in memory locations storing metadata associated with all data it is reading transactionally;
   (f) each thread writes the metadata associated with all data it is modifying transactionally, thereby inducing a call to the alert handler of each transactionally reading thread; and
   (g) the alert handler aborts the current transaction of its thread.

5. The method of claim 4, wherein:
   (h) if the number of memory locations in which a thread indicates interest exceeds the marking capacity of the hardware, the thread is caused to call its alert handler with an indication that said capacity has been exceeded;
   (i) each thread maintains an estimate of the amount of metadata in which it can indicate interest without exceeding the marking capacity of the hardware;
   (j) in lieu of indicating interest in metadata beyond said estimate, each thread incrementally validates previously read data whenever inconsistency in said data might otherwise lead to incorrect behavior; and
   (k) if a thread is caused to execute its alert handler with an indication that the marking capacity of the hardware has been exceeded, it reduces its estimate before retrying its transaction.

6. A method for choosing whether to commit speculative writes in a cache-coherent shared-memory computer in which such writes have been indicated, and their lines so marked in a local cache, the method comprising:
   (a) distinguishing, in a cache coherence protocol, between ordinary and speculative requests for exclusive access to a line;
   (b) retaining, in the local cache, lines that have been speculatively written, despite speculative remote requests for exclusive access to those lines; and
   (c) providing an atomic conditional-validate operation which attempts to update a location that has not been speculatively written, which, if successful, makes all speculatively written lines in the local cache appear to have been non-speculatively written, and which, if unsuccessful, makes all speculatively written or threatened lines in the local cache appear to be invalid.

7. The method of claim 6, wherein each thread registers an alert handler, and if the number of lines that have been speculatively written exceeds the marking capacity of the cache, the thread is caused to call its handler with an indication that said capacity has been exceeded.

8. The method of claim 6, for a system in which speculative reads have also been indicated, and their lines so marked in a local cache, the method further comprising:
   (d) sending, in response to remote coherence protocol requests for a shared copy of a line that has been speculatively written locally, an indication that the line is "threatened";
   (e) similarly treating as threatened any line that has been speculatively read locally, and for which a speculative remote request for exclusive access is received;
   (f) retaining threatened, speculatively read lines in the local cache, but marking said threatened, speculatively read lines as threatened; and
   (g) augmenting the conditional-validate operation such that regardless of outcome, threatened lines in the local cache appear to be invalid, and speculatively read but non-threatened lines in the local cache appear to have been non-speculatively read.

9. The method of claim 8, wherein each thread registers an alert handler, and if the number of lines that have been speculatively written exceeds the marking capacity of the cache, the thread is caused to call its handler with an indication that said capacity has been exceeded.

10. The method of claim 8, wherein:
   (h) one bit in the tag of a cache line indicates that the line has been speculatively accessed (read or written) since the most recent invalidate or conditional-validate operation;
   (i) one bit indicates that the most recent write to the line was speculative;
   (j) one bit indicates, for any line that has not been accessed since the last time at which the bit in (h) was set and an invalidate or conditional-validate operation occurred, whether said operation was a successful conditional-validate;
   (k) additional bits indicate the state of the line according to the underlying coherence protocol;
   (l) at the time of an invalidate or conditional-validate operation, the cache controller uses the bit in (h) to determine whether to modify the bit in (j);
   (m) a line is interpreted as being invalid if the bit in (h) is unset and either the line appears to be invalid according to the bits in (k), or else the line appears to have been written according to the bits in (k), but the bit in (i) is set and the bit in (j) is unset;
   (n) a line is interpreted as having been non-speculatively written if it appears to have been written according to the bits in (k), the bit in (h) is unset, and either the bit in (i) is unset or the bit in (j) is set;
   (o) on any access to a line, the cache controller unsets the bit in (j); and
   (p) on any access other than a speculative write to a line for which the bit in (h) is unset, the cache controller unsets the bit in (i).

11. The method of claim 6, further comprising:
   (a') indicating an address of a software alert handler for each thread that is interested in monitoring remote access to memory;
   (b') indicating, for each such thread, memory locations to be monitored for remote writes or eviction from a local cache;
   (c') effecting in hardware an immediate subroutine call to the software alert handler of a thread that is interested in monitoring remote access to memory when a remote write or an eviction from the local cache occurs; and
   (d') determining in the software alert handler how to respond to the remote write or eviction from the local cache; and
   a software transactional memory process in which:
   (q) threads use speculative writes to modify data transactionally, eliminating the need to modify private copies of those data;
   (r) each thread indicates interest in metadata associated with its current transaction and with all data it is reading transactionally;
   (s) each thread writes the metadata of all data it will modify transactionally, thereby inducing an immediate call to the alert handler of each thread that is reading the data transactionally;
   (t) each thread writes the metadata of any transaction it needs to abort, thereby inducing an immediate call to the alert handler of the thread executing said transaction;
   (u) the alert handler aborts the current transaction of its thread; and
   (v) software ensures that (i) a transaction commits if and only if it ends with a successful conditional-validate instruction;
   (ii) if concurrent transactions write the same datum, at most one of them commits; and
   (iii) if a concurrent reader and writer of the same datum both commit, the reader does so first.

12. The method of claim 11, for a system in which speculative reads have also been indicated, and their lines so marked in a local cache, said method further comprising:
   (d) sending, in response to remote coherence protocol requests for a shared copy of a line that has been speculatively written locally, an indication that the line is threatened;
   (e) similarly treating as threatened any line that has been speculatively read locally, and for which a speculative remote request for exclusive access is received;
   (f) retaining threatened, speculatively read lines in the local cache, but marking the threatened, speculatively read lines as threatened; and
   (g) augmenting the conditional-validate operation such that regardless of outcome, threatened lines in the local cache appear to be invalid, and speculatively read but non-threatened lines in the local cache appear to have been non-speculatively read; and
   wherein threads further use speculative reads to inspect transactional data, eliminating the need to re-load lines in the wake of speculative remote requests for exclusive access to those lines.

13. The method of claim 11, wherein:
   (w) each thread registers an alert handler, and if the number of lines that have been speculatively written exceeds the marking capacity of the cache, the thread is caused to call its handler with an indication that said capacity has been exceeded;
   (x) in response to an indication that the marking capacity of the cache has been exceeded, the alert handler aborts the current transaction and retries in an overflow mode;
   (y) a thread that is executing a transaction in overflow mode modifies the metadata of all data it reads, to make itself visible to writers; and
   (z) a thread explicitly aborts all visible readers of data it modifies.

14. The method of claim 11, wherein software may choose to delay the action in (s) until just before a thread attempts to commit its transaction, thereby permitting a writer to proceed speculatively in parallel with readers, or with another writer;
in this case the writer transaction indicates interest in the metadata of all data it is speculatively writing.

15. A system for managing a computer memory which is accessible to a plurality of threads and for decoupling monitoring and detection of activity on a memory location in the computer memory from a corresponding reaction, the system comprising:
a plurality of local caches in communication with the computer memory; and
a processor or processors for:
(a) indicating an address of a software alert handler for each thread that is interested in monitoring remote access to the computer memory;
(b) indicating, for each such thread, memory locations to be monitored for remote writes or eviction from at least one of the plurality of local caches;
(c) effecting in hardware an immediate subroutine call to the software alert handler of a thread that is interested in monitoring remote access to the computer memory when a remote write or an eviction from at least one of the plurality of local caches occurs; and
(d) determining in the software alert handler how to respond to the remote write or eviction from at least one of the plurality of local caches.

16. The system of claim 15, wherein if the number of memory locations in which a thread indicates interest exceeds the marking capacity of the hardware, the thread is caused to call its alert handler with an indication that said capacity has been exceeded.

17. The system of claim 15, wherein the processor or processors further perform a response to local writes and, optionally, reads:
(e) receiving indications from each interested thread of the memory locations for which local writes and, optionally, reads are to be monitored;
(f) effecting in hardware, in each interested thread, an immediate subroutine call to the software alert handler of the thread when a local write or read of a memory location indicated by the thread is detected and;
(g) determining in the software alert handler how to respond to the detected local write or read.

18. The system of claim 15, wherein the processor or processors further implement a software transactional memory system in which
(e) each thread indicates interest in memory locations storing metadata associated with all data it is reading transactionally;
(f) each thread writes the metadata associated with all data it is modifying transactionally, thereby inducing a call to the alert handler of each transactionally reading thread; and
(g) the alert handler aborts the current transaction of its thread.

19. The system of claim 18, wherein:
(h) if the number of memory locations in which a thread indicates interest exceeds the marking capacity of the hardware, the thread is caused to call its alert handler with an indication that said capacity has been exceeded;
(i) each thread maintains an estimate of the amount of metadata in which it can indicate interest without exceeding the marking capacity of the hardware;
(j) in lieu of indicating interest in metadata beyond said estimate, each thread incrementally validates previously read data whenever inconsistency in said data might otherwise lead to incorrect behavior; and
(k) if a thread is caused to execute its alert handler with an indication that the marking capacity of the hardware has been exceeded, it reduces its estimate before retrying its transaction.

20. A system for choosing whether to commit speculative writes in a cache-coherent shared-memory computer in which such writes have been indicated, and their lines so marked in a local cache, the system comprising:
a plurality of caches in communication with the computer memory; and
a processor or processors for:
(a) distinguishing, in a cache coherence protocol, between ordinary and speculative requests for exclusive access to a line;
(b) retaining, in the local cache, lines that have been speculatively written, despite speculative remote requests for exclusive access to those lines; and
(c) providing an atomic conditional-validate operation which attempts to update a location that has not been speculatively written, which, if successful, makes all speculatively written lines in the local cache appear to have been non-speculatively written, and which, if unsuccessful, makes all speculatively written or threatened lines in the local cache appear to be invalid.

21. The system of claim 20, wherein each thread registers an alert handler, and if the number of lines that have been speculatively written exceeds the marking capacity of the cache, the thread is caused to call its handler with an indication that said capacity has been exceeded.

22. The system of claim 20, in which speculative reads have also been indicated, and their lines so marked in a local cache, wherein the processor or processors further perform:
(d) sending, in response to remote coherence protocol requests for a shared copy of a line that has been speculatively written locally, an indication that the line is "threatened";
(e) similarly treating as threatened any line that has been speculatively read locally, and for which a speculative remote request for exclusive access is received;
(f) retaining threatened, speculatively read lines in the local cache, but marking said threatened, speculatively read lines as threatened; and
(g) augmenting the conditional-validate operation such that regardless of outcome, threatened lines in the local cache appear to be invalid, and speculatively read but non-threatened lines in the local cache appear to have been non-speculatively read.

23. The system of claim 22, wherein each thread registers an alert handler, and if the number of lines that have been speculatively written exceeds the marking capacity of the cache, the thread is caused to call its handler with an indication that said capacity has been exceeded.

24. The system of claim 22, wherein:
(h) one bit in the tag of a cache line indicates that the line has been speculatively accessed (read or written) since the most recent invalidate or conditional-validate operation;
(i) one bit indicates that the most recent write to the line was speculative;
(j) one bit indicates, for any line that has not been accessed since the last time at which the bit in (h) was set and an invalidate or conditional-validate operation occurred, whether said operation was a successful conditional-validate;

(k) additional bits indicate the state of the line according to the underlying coherence protocol;
(l) at the time of an invalidate or conditional-validate operation, the cache controller uses the bit in (h) to determine whether to modify the bit in (j);
(m) a line is interpreted as being invalid if the bit in (h) is unset and either the line appears to be invalid according to the bits in (k), or else the line appears to have been written according to the bits in (k), but the bit in (i) is set and the bit in (j) is unset;
(n) a line is interpreted as having been non-speculatively written if it appears to have been written according to the bits in (k), the bit in (h) is unset, and either the bit in (i) is unset or the bit in (j) is set;
(o) on any access to a line, the cache controller unsets the bit in (j); and
(p) on any access other than a speculative write to a line for which the bit in (h) is unset, the cache controller unsets the bit in (i).

25. The system of claim 20, wherein the processor or processors further perform:
(a') indicating an address of a software alert handler for each thread that is interested in monitoring remote access to memory;
(b') indicating, for each such thread, memory locations to be monitored for remote writes or eviction from a local cache;
(c') effecting in hardware an immediate subroutine call to the software alert handler of a thread that is interested in monitoring remote access to memory when a remote write or an eviction from the local cache occurs; and
(d') determining in the software alert handler how to respond to the remote write or eviction from the local cache; and
wherein the processor or processors further implement a software transactional memory system in which:
(q) threads use speculative writes to modify data transactionally, eliminating the need to modify private copies of those data;
(r) each thread indicates interest in metadata associated with its current transaction and with all data it is reading transactionally;
(s) each thread writes the metadata of all data it will modify transactionally, thereby inducing an immediate call to the alert handler of each thread that is reading the data transactionally;
(t) each thread writes the metadata of any transaction it needs to abort, thereby inducing an immediate call to the alert handler of the thread executing said transaction;
(u) the alert handler aborts the current transaction of its thread; and
(v) software ensures that (i) a transaction commits if and only if it ends with a successful conditional-validate instruction;
(ii) if concurrent transactions write the same datum, at most one of them commits; and
(iii) if a concurrent reader and writer of the same datum both commit, the reader does so first.

26. The system of claim 25, wherein speculative reads have also been indicated, and their lines so marked in a local cache, and wherein the processor or processors further implement:
(d) sending, in response to remote coherence protocol requests for a shared copy of a line that has been speculatively written locally, an indication that the line is threatened;
(e) similarly treating as threatened any line that has been speculatively read locally, and for which a speculative remote request for exclusive access is received;
(f) retaining threatened, speculatively read lines in the local cache, but marking the threatened, speculatively read lines as threatened; and
(g) augmenting the conditional-validate operation such that regardless of outcome, threatened lines in the local cache appear to be invalid, and speculatively read but non-threatened lines in the local cache appear to have been non-speculatively read; and
wherein threads further use speculative reads to inspect transactional data, eliminating the need to re-load lines in the wake of speculative remote requests for exclusive access to those lines.

27. The system of claim 25, wherein:
(w) each thread registers an alert handler, and if the number of lines that have been speculatively written exceeds the marking capacity of the cache, the thread is caused to call its handler with an indication that said capacity has been exceeded (x) in response to an indication that the marking capacity of the cache has been exceeded, the alert handler aborts the current transaction and retries in an overflow mode;
(y) a thread that is executing a transaction in overflow mode modifies the metadata of all data it reads, to make itself visible to writers; and
(z) a thread explicitly aborts all visible readers of data it modifies.

28. The system of claim 25, wherein software may choose to delay the action in (s) until just before a thread attempts to commit its transaction, thereby permitting a writer to proceed speculatively in parallel with readers, or with another writer;
in this case the writer transaction indicates interest in the metadata of all data it is speculatively writing.

29. An article of manufacture for decoupling monitoring and detection of activity on a memory location from a corresponding reaction, the article of manufacture comprising:
a non-transitory computer-readable storage medium; and
code, stored on the non-transitory computer-readable storage medium, for controlling a processor or processors for:
(a) indicating an address of a software alert handler for each thread that is interested in monitoring remote access to memory;
(b) indicating, for each such thread, memory locations to be monitored for remote writes or eviction from a local cache;
(c) effecting in hardware an immediate subroutine call to the software alert handler of a thread that is interested in monitoring remote access to memory when a remote write or an eviction from the local cache occurs; and
(d) determining in the software alert handler how to respond to the remote write or eviction from the local cache.

30. The article of manufacture of claim 29, wherein if the number of memory locations in which a thread indicates interest exceeds the marking capacity of the hardware, the thread is caused to call its alert handler with an indication that said capacity has been exceeded.

31. The article of manufacture of claim 29, wherein the code comprises code for response to local writes and, optionally, reads:
(e) receiving indications from each interested thread of the memory locations for which local writes and, optionally, reads are to be monitored;

(f) effecting in hardware, in each interested thread, an immediate subroutine call to the software alert handler of the thread when a local write or read of a memory location indicated by the thread is detected and;

(g) determining in the software alert handler how to respond to the detected local write or read.

32. The article of manufacture of claim 29, wherein the code comprises code for implementing a software transactional memory system in which (e) each thread indicates interest in memory locations storing metadata associated with all data it is reading transactionally;

(f) each thread writes the metadata associated with all data it is modifying transactionally, thereby inducing a call to the alert handler of each transactionally reading thread; and (g) the alert handler aborts the current transaction of its thread.

33. The article of manufacture of claim 32, wherein:

(h) if the number of memory locations in which a thread indicates interest exceeds the marking capacity of the hardware, the thread is caused to call its alert handler with an indication that said capacity has been exceeded;

(i) each thread maintains an estimate of the amount of metadata in which it can indicate interest without exceeding the marking capacity of the hardware;

(j) in lieu of indicating interest in metadata beyond said estimate, each thread incrementally validates previously read data whenever inconsistency in said data might otherwise lead to incorrect behavior; and (k) if a thread is caused to execute its alert handler with an indication that the marking capacity of the hardware has been exceeded, it reduces its estimate before retrying its transaction.

34. An article of manufacture for choosing whether to commit speculative writes in a cache-coherent shared-memory computer in which such writes have been indicated, and their lines so marked in a local cache, the article of manufacture comprising:

a computer-readable storage medium; and code, stored on the computer-readable storage medium, for controlling a processor or processors for:

(a) distinguishing, in a cache coherence protocol, between ordinary and speculative requests for exclusive access to a line;

(b) retaining, in the local cache, lines that have been speculatively written, despite speculative remote requests for exclusive access to those lines; and (c) providing an atomic conditional-validate operation which attempts to update a location that has not been speculatively written, which, if successful, makes all speculatively written lines in the local cache appear to have been non-speculatively written, and which, if unsuccessful, makes all speculatively written or threatened lines in the local cache appear to be invalid.

35. The article of manufacture of claim 34, wherein each thread registers an alert handler, and if the number of lines that have been speculatively written exceeds the marking capacity of the cache, the thread is caused to call its handler with an indication that said capacity has been exceeded.

36. The article of manufacture of claim 34, for a system in which speculative reads have also been indicated, and their lines so marked in a local cache, wherein the code comprises code for:

(d) sending, in response to remote coherence protocol requests for a shared copy of a line that has been speculatively written locally, an indication that the line is "threatened";

(e) similarly treating as threatened any line that has been speculatively read locally, and for which a speculative remote request for exclusive access is received;

(f) retaining threatened, speculatively read lines in the local cache, but marking said threatened, speculatively read lines as threatened; and (g) augmenting the conditional-validate operation such that regardless of outcome, threatened lines in the local cache appear to be invalid, and speculatively read but non-threatened lines in the local cache appear to have been non-speculatively read.

37. The article of manufacture of claim 36, wherein each thread registers an alert handler, and if the number of lines that have been speculatively written exceeds the marking capacity of the cache, the thread is caused to call its handler with an indication that said capacity has been exceeded.

38. The article of manufacture of claim 36, wherein:

(h) one bit in the tag of a cache line indicates that the line has been speculatively accessed (read or written) since the most recent invalidate or conditional-validate operation;

(i) one bit indicates that the most recent write to the line was speculative;

(j) one bit indicates, for any line that has not been accessed since the last time at which the bit in (h) was set and an invalidate or conditional-validate operation occurred, whether said operation was a successful conditional-validate;

(k) additional bits indicate the state of the line according to the underlying coherence protocol;

(l) at the time of an invalidate or conditional-validate operation, the cache controller uses the bit in (h) to determine whether to modify the bit in (j);

(m) a line is interpreted as being invalid if the bit in (h) is unset and either the line appears to be invalid according to the bits in (k), or else the line appears to have been written according to the bits in (k), but the bit in (i) is set and the bit in (j) is unset;

(n) a line is interpreted as having been non-speculatively written if it appears to have been written according to the bits in (k), the bit in (h) is unset, and either the bit in (i) is unset or the bit in (j) is set;

(o) on any access to a line, the cache controller unsets the bit in (j); and (p) on any access other than a speculative write to a line for which the bit in (h) is unset, the cache controller unsets the bit in (i).

39. The article of manufacture of claim 34, wherein the code comprises code for:

(a') indicating an address of a software alert handler for each thread that is interested in monitoring remote access to memory;

(b') indicating, for each such thread, memory locations to be monitored for remote writes or eviction from a local cache;

(c') effecting in hardware an immediate subroutine call to the software alert handler of a thread that is interested in monitoring remote access to memory when a remote write or an eviction from the local cache occurs; and (d') determining in the software alert handler how to respond to the remote write or eviction from the local cache; and a software transactional memory process in which:

(q) threads use speculative writes to modify data transactionally, eliminating the need to modify private copies of those data;

(r) each thread indicates interest in metadata associated with its current transaction and with all data it is reading transactionally;

(s) each thread writes the metadata of all data it will modify transactionally, thereby inducing an immediate call to the alert handler of each thread that is reading the data transactionally;

(t) each thread writes the metadata of any transaction it needs to abort, thereby inducing an immediate call to the alert handler of the thread executing said transaction;

(u) the alert handler aborts the current transaction of its thread; and (v) software ensures that (i) a transaction commits if and only if it ends with a successful conditional-validate instruction;

(ii) if concurrent transactions write the same datum, at most one of them commits; and (iii) if a concurrent reader and writer of the same datum both commit, the reader does so first.

40. The article of manufacture of claim 39, for a system in which speculative reads have also been indicated, and their lines so marked in a local cache, wherein the code comprises code for:

(d) sending, in response to remote coherence protocol requests for a shared copy of a line that has been speculatively written locally, an indication that the line is threatened;

(e) similarly treating as threatened any line that has been speculatively read locally, and for which a speculative remote request for exclusive access is received;

(f) retaining threatened, speculatively read lines in the local cache, but marking the threatened, speculatively read lines as threatened; and (g) augmenting the conditional-validate operation such that regardless of outcome, threatened lines in the local cache appear to be invalid, and speculatively read but non-threatened lines in the local cache appear to have been non-speculatively read; and wherein threads further use speculative reads to inspect transactional data, eliminating the need to re-load lines in the wake of speculative remote requests for exclusive access to those lines.

41. The article of manufacture of claim 39, wherein:

(w) each thread registers an alert handler, and if the number of lines that have been speculatively written exceeds the marking capacity of the cache, the thread is caused to call its handler with an indication that said capacity has been exceeded (x) in response to an indication that the marking capacity of the cache has been exceeded, the alert handler aborts the current transaction and retries in an overflow mode;

(y) a thread that is executing a transaction in overflow mode modifies the metadata of all data it reads, to make itself visible to writers; and (z) a thread explicitly aborts all visible readers of data it modifies.

42. The article of manufacture of claim 39, wherein software may choose to delay the action in (s) until just before a thread attempts to commit its transaction, thereby permitting a writer to proceed speculatively in parallel with readers, or with another writer;

in this case the writer transaction indicates interest in the metadata of all data it is speculatively writing.

\* \* \* \* \*